(12) United States Patent
Wakashiro et al.

(10) Patent No.: US 7,957,884 B2
(45) Date of Patent: Jun. 7, 2011

(54) RUNNING CONTROL APPARATUS FOR VEHICLE

(75) Inventors: Teruo Wakashiro, Sakura (JP); Koichiro Ozawa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1105 days.

(21) Appl. No.: 11/727,685

(22) Filed: Mar. 28, 2007

(65) Prior Publication Data
US 2007/0255478 A1 Nov. 1, 2007

(30) Foreign Application Priority Data

Apr. 28, 2006 (JP) .................................. 2006-126713

(51) Int. Cl.
*B60T 8/32* (2006.01)
(52) U.S. Cl. ............................................. 701/93; 701/96
(58) Field of Classification Search .................... 701/93, 701/96
See application file for complete search history.

(56) References Cited

U.S. PATENT DOCUMENTS

| | | | | |
|---|---|---|---|---|
| 6,820,709 B1 * | 11/2004 | Zimmermann et al. | ...... | 180/169 |
| 7,016,803 B2 * | 3/2006 | Kitazawa | ...... | 702/142 |
| 7,706,953 B1 * | 4/2010 | Sun | ...... | 701/93 |
| 2003/0154016 A1 * | 8/2003 | Manaka | ...... | 701/96 |
| 2004/0193354 A1 * | 9/2004 | Dunoyer et al. | ...... | 701/96 |
| 2006/0161330 A1 * | 7/2006 | Lupo | ...... | 701/93 |
| 2006/0167611 A1 * | 7/2006 | Ogawa | ...... | 701/96 |
| 2007/0255478 A1 * | 11/2007 | Wakashiro et al. | ...... | 701/93 |

FOREIGN PATENT DOCUMENTS

| | | |
|---|---|---|
| CN | 1605732 A | 4/2005 |
| JP | 4-238744 A | 8/1992 |
| JP | 8-295155 A | 11/1996 |
| JP | 10-151964 A | 6/1998 |
| JP | 11-48824 A | 2/1999 |
| JP | 2001-157308 A | 6/2001 |
| JP | 2004-34886 A | 2/2004 |
| JP | 2005-160252 A | 6/2005 |
| JP | 2007-55357 A | 3/2007 |

\* cited by examiner

*Primary Examiner* — Khoi Tran
*Assistant Examiner* — Brian J Broadhead
(74) *Attorney, Agent, or Firm* — Arent Fox, LLP

(57) ABSTRACT

A running control apparatus for a vehicle controls a state of running using a driving source for generating a driving force of the vehicle. The apparatus includes an accelerator pedal measuring device for measuring a degree of depression of an accelerator pedal of the vehicle; and a vehicle speed measuring device for measuring a vehicle speed of the vehicle. A driving-force maintenance mode for maintaining the driving force or a vehicle-speed maintenance mode for maintaining the vehicle speed is executed based on the measured degree of depression of the accelerator pedal and the measured vehicle speed. The apparatus may include an inter-vehicle distance measuring device for measuring an inter-vehicle distance between the present vehicle and a vehicle ahead thereof. An inter-vehicle-distance maintenance mode is also provided so as to maintain the inter-vehicle distance based on the measured degree of depression of the accelerator pedal and the measured inter-vehicle distance.

15 Claims, 20 Drawing Sheets

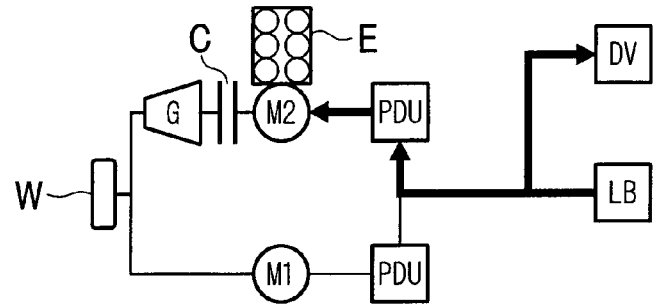
FIG. 2 START (INITIAL STARTING) MODE
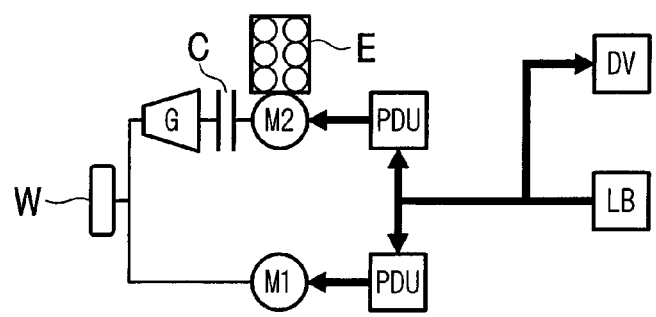
FIG. 3 START (EV STARTING) MODE
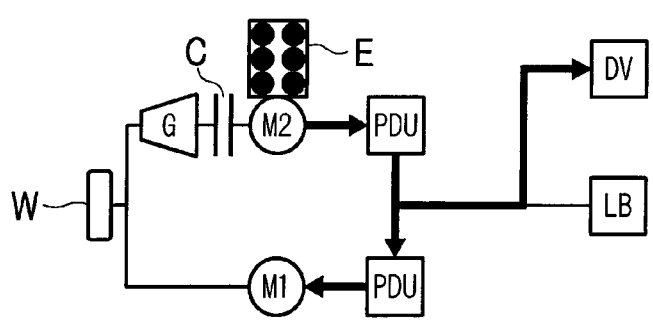
FIG. 4 E-PASS EV MODE
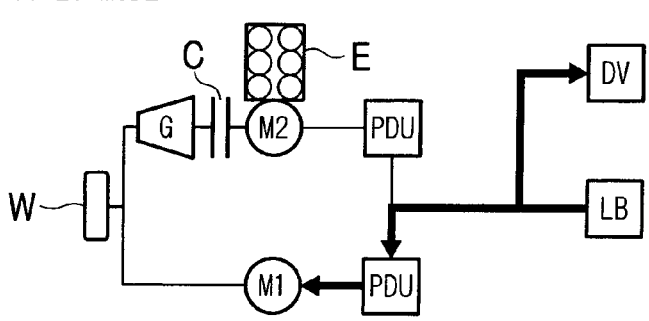
FIG. 5 BATT EV MODE FIG. 6 S-REGEN MODE
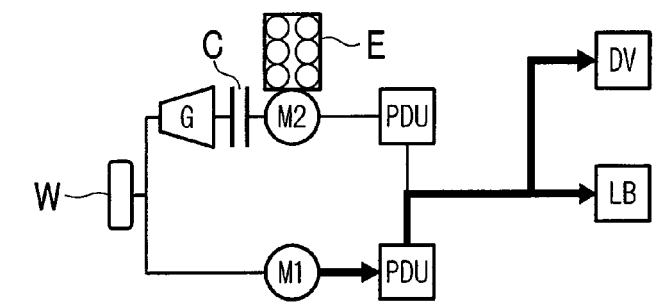
FIG. 7 CHARGE EV MODE
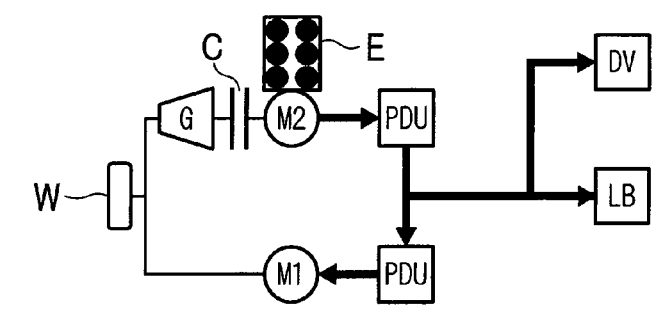
FIG. 8 IDLE STOP MODE
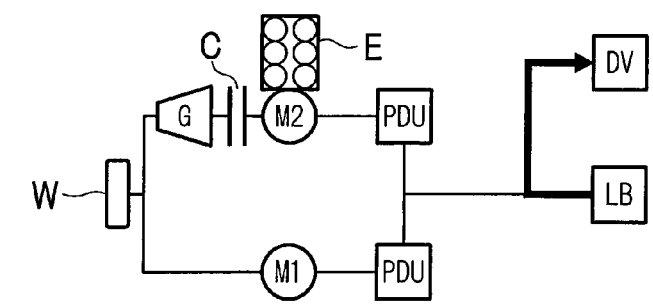
FIG. 9 IDLE MODE
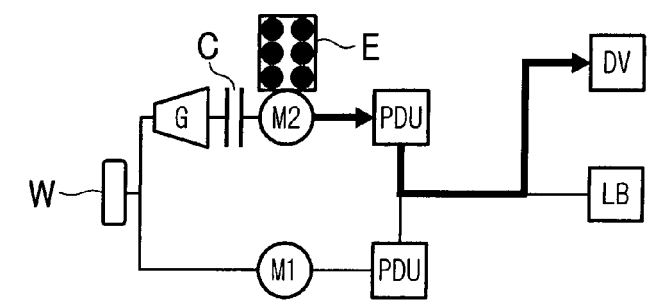

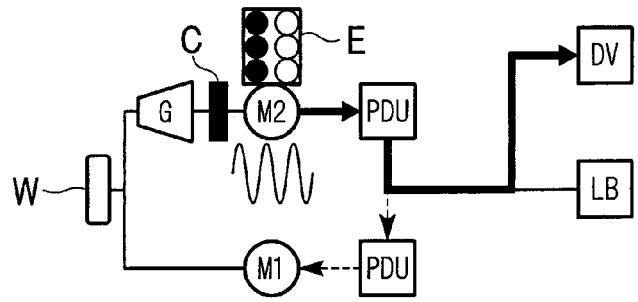
FIG. 14 CYLINDER STOP LOCK-UP +ANV MODE
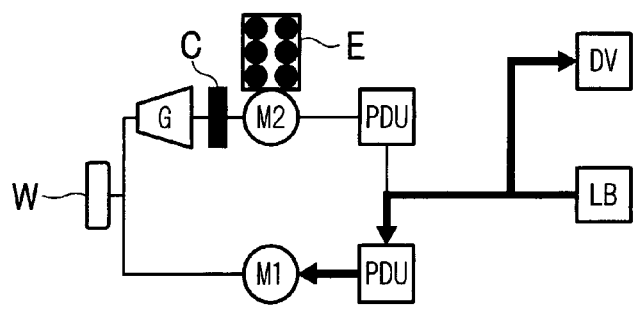
FIG. 15 V6 LOCK-UP S-ASSIST MODE
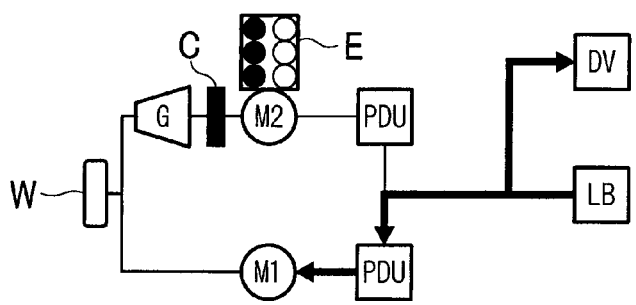
FIG. 16 CYLINDER STOP LOCK-UP S-ASSIST MODE
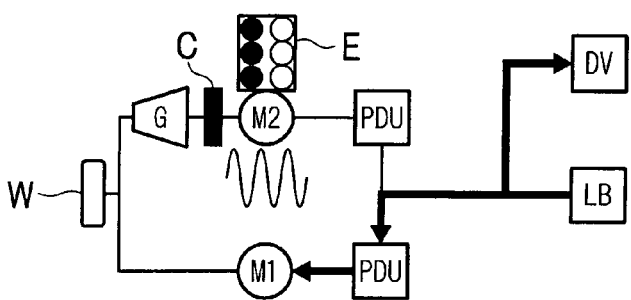
FIG. 17 CYLINDER STOP LOCK-UP S-ASSIST +ANV MODE

CYLINDER STOP LOCK-UP S-REGEN MODE

CYLINDER STOP LOCK-UP P-REGEN MODE

RUNNING CONTROL APPARATUS FOR VEHICLE

BACKGROUND OF THE INVENTION

1. Field of the Invention

The present invention relates to a running control apparatus for a vehicle which can run in a low fuel-consumption mode, in particular, a running control apparatus for further improving the fuel consumption.

Priority is claimed on Japanese Patent Application No. 2006-126713, filed Apr. 28, 2006, the content of which is incorporated herein by reference.

2. Description of the Related Art

In a known example of a hybrid vehicle, the vehicle speed is controlled when the accelerator is not operated (i.e., OFF), and when acceleration is required during the vehicle speed control, a torque assisting operation is performed using a motor, so as to control the deceleration and improve the fuel consumption (see Japanese Unexamined Patent Application, First Publication No. 2005-160252).

In the above known example, the deceleration control is performed only when the accelerator is OFF, so as to control the quantity of assistance (i.e., assisted torque) based on an amount of remaining power of a battery, an inter-vehicle distance between the present vehicle and a vehicle ahead thereof, a relative velocity, and various data with respect to the running state of the vehicle. However, actually, the quantity of assisted torque is uniformly set using values defined in a map or a table, which may not be satisfactory to the driver. Therefore, when the driver feels a large deceleration while the accelerator is OFF, the driver may depresses the accelerator pedal again. If such a depression of the accelerator pedal is repeated, the fuel consumption cannot be improved.

SUMMARY OF THE INVENTION

In light of the above circumstances, an object of the present invention is to provide a running control apparatus for a vehicle, so as to improve the fuel consumption without making the driver feel unsatisfactory.

Therefore, the present invention provides a running control apparatus for a vehicle, wherein the control apparatus controls a state of running using a driving source for generating a driving force of the vehicle, and comprises:

an accelerator pedal measuring device for measuring a degree of depression of an accelerator pedal of the vehicle; and a vehicle speed measuring device for measuring a vehicle speed of the vehicle, wherein a driving-force maintenance mode (refer to step S112 in an embodiment explained later) for maintaining the driving force or a vehicle-speed maintenance mode (refer to step S132 in the embodiment) for maintaining the vehicle speed is executed based on the measured degree of depression of the accelerator pedal and the measured vehicle speed.

In accordance with the above structure, it is possible to determine whether a variation in the degree of depression of the accelerator pedal has occurred for maintaining the driving force or for maintaining the vehicle speed, based on the amount of variation in the degree of depression of the accelerator pedal measured by the accelerator pedal measuring device. Therefore, the vehicle can run in the driving-force maintenance mode or the vehicle-speed maintenance mode, without influence of the operation of the accelerator pedal. Accordingly, it is possible to prevent increase in the fuel consumption due to a variation in the degree of depression of the accelerator pedal, which is involuntarily performed by the driver so as to maintain the driving force or the vehicle speed, and thus the fuel consumption can be improved.

In a typical example:

when an amount of variation in the degree of depression of the accelerator pedal is within a predetermined first range (e.g., executed when "YES" in step S109 in the embodiment), the driving-force maintenance mode is executed; and when the amount of variation in the degree of depression of the accelerator pedal is within a predetermined second range (e.g., executed when "YES" in step S129 in the embodiment), and an amount of variation in the vehicle speed is within a predetermined range (e.g., executed when "YES" in step S108 in the embodiment), the vehicle-speed maintenance mode is executed.

Accordingly, it is possible to clearly determine whether a target subject for maintenance with respect to a relevant range for the amount of variation in the degree of depression of the accelerator pedal is the driving force or the vehicle speed. Therefore, a control target of the driver, which is represented as a variation in the degree of depression of the accelerator pedal, can be reliably detected, and maintenance with respect to the control target can be performed.

The running control apparatus may further comprise:

an inter-vehicle distance measuring device (e.g., a millimeter-wave radar 28 in the embodiment) for measuring an inter-vehicle distance between the present vehicle and a vehicle ahead thereof, wherein an inter-vehicle-distance maintenance mode (refer to step S122 in the embodiment) is also provided so as to maintain the inter-vehicle distance based on the measured degree of depression of the accelerator pedal and the measured inter-vehicle distance.

In accordance with this structure, based on the amount of variation in the degree of depression of the accelerator pedal measured by the accelerator pedal measuring device, it is possible to determine whether the variation in the degree of depression of the accelerator pedal has occurred for maintaining the inter-vehicle distance. Therefore, the vehicle can run in the inter-vehicle-distance maintenance mode without influence of the operation of the accelerator pedal. Accordingly, it is possible to prevent increase in the fuel consumption due to a variation in the degree of depression of the accelerator pedal, which is involuntarily performed by the driver so as to maintain the inter-vehicle distance, and thus the fuel consumption can be improved.

Typically, when an amount of variation in the degree of depression of the accelerator pedal is within a predetermined third range (e.g., executed when "YES" in step S119 in the embodiment), and an amount of variation in the inter-vehicle distance is within a predetermined range (e.g., executed when "YES" in step S107 in the embodiment), the inter-vehicle-distance maintenance mode is executed.

Accordingly, it is possible to clearly determine that a target subject for maintenance with respect to a relevant range for the amount of variation in the degree of depression of the accelerator pedal is the inter-vehicle distance. Therefore, a control target of the driver, which is represented as a variation in the degree of depression of the accelerator pedal, can be reliably detected, and maintenance with respect to the control target can be performed.

In this case, in a typical example, the predetermined first range is set within the predetermined second range; and the predetermined second range is set within the predetermined third range.

Accordingly, the frequency of selecting the control target corresponding to a smaller variation in the degree of depression of the accelerator pedal can be increased, thereby resulting in decrease in the fuel consumption.

In addition, the predetermined first range, the predetermined second range, and the predetermined third range may be each set based on a moving average (e.g., a moving average APAVE in the embodiment) with respect to the degree of depression of the accelerator pedal.

Accordingly, it is possible to clearly determine which of the driving force, the vehicle speed, and the inter-vehicle distance is a control target for causing a variation in the degree of depression of the accelerator pedal. Therefore, the driver's intention can be accurately grasped.

Preferably, each of the above modes is executed when the condition for executing the mode has been satisfied for a predetermined time period (e.g., a timer value TSTB1 in the embodiment) (e.g., executed when "YES" in step S110, S120, or S130 in the embodiment). Accordingly, the relevant mode is not executed when the condition for executing the mode has not been satisfied for the predetermined time period, thereby preventing a hunting phenomenon with respect to the control.

Also preferably, each of the above modes is released when the condition for executing the mode has not been satisfied for a predetermined time period (e.g., a timer value TSTB2 in the embodiment) (e.g., executed when "YES" in step S115, S125, or S135 in the embodiment). Accordingly, the relevant mode is not released unless the condition for executing the mode has been satisfied for the predetermined time period, thereby preventing a hunting phenomenon with respect to the control.

It is possible that:

the vehicle is a hybrid vehicle which can run by only using a motor;

an upper limit (e.g., a permissive upper-limit drive output power PREQLMT for the driving operation in a BATT EV mode in the embodiment) of a required drive output power (e.g., a required drive output power PREQ in the embodiment) is set so as to determine whether running of the vehicle by only using the motor can be continued;

while the driving-force maintenance mode is executed, a difference between the driving force (e.g., a present driving force FACT in the embodiment), which is measured when the amount of variation in the degree of depression of the accelerator pedal exceeds the predetermined first range in the previous execution of the driving-force maintenance mode, and a target value (e.g., a target driving force FTG in the embodiment) of the driving force set in the previous execution of the driving-force maintenance mode is determined as a control maintenance permissive value (e.g., a permissive delta driving force DFTGL in the embodiment) (refer to step S214 in the embodiment); and when a difference between a target value of the driving force set in the present execution of the driving-force maintenance mode and the control maintenance permissive value is larger than a present required value of the driving force (e.g., executed when "YES" in step S407 in the embodiment), and the required drive output power with respect to the motor is larger than the upper limit (e.g., executed when "YES" in step S408 in the embodiment), the required drive output power is set to the upper limit (refer to step S409 in the embodiment).

In accordance with the above structure, when the vehicle runs in the driving-force maintenance mode regardless of variation in degree of depression of the accelerator pedal, the difference between the driving force targeted by the driver and the set target value can be grasped as the control maintenance permissive value. When the difference between the target value of the driving force and the control maintenance permissive value is larger than the present required value of the driving force, even if the required drive output power with respect to the motor is larger than the upper limit, the required drive output power is set to the upper limit, and the vehicle can run using the motor.

It is also possible that:

the vehicle is a hybrid vehicle which can run by only using a motor;

an upper limit of a required drive output power is set so as to determine whether running of the vehicle by only using the motor can be continued;

while the vehicle-speed maintenance mode is executed, a difference between the vehicle speed (e.g., a vehicle speed VP in the embodiment), which is measured when the amount of variation in the degree of depression of the accelerator pedal exceeds the predetermined second range in the previous execution of the vehicle-speed maintenance mode, and a target value (e.g., a target vehicle speed VPTG in the embodiment) of the vehicle speed set in the previous execution of the vehicle-speed maintenance mode is determined as a control maintenance permissive value (e.g., a permissive delta vehicle speed DVPTGL in the embodiment) (refer to step S217 in the embodiment); and when a difference between a target value of the vehicle speed set in the present execution of the vehicle-speed maintenance mode and the control maintenance permissive value is smaller than a present value of the vehicle speed (e.g., executed when "YES" in step S410 in the embodiment), and the required drive output power with respect to the motor is larger than the upper limit (e.g., executed when "YES" in step S411 in the embodiment), the required drive output power is set to the upper limit (refer to step S412 in the embodiment).

In accordance with the above structure, when the vehicle runs in the vehicle-speed maintenance mode regardless of variation in degree of depression of the accelerator pedal, the difference between the vehicle speed targeted by the driver and the set target value can be grasped as the control maintenance permissive value. When the difference between the target value of the vehicle speed and the control maintenance permissive value is smaller than the present vehicle speed, even if the required drive output power with respect to the motor is larger than the upper limit, the required drive output power is set to the upper limit, and the vehicle can run using the motor.

It is also possible that:

the vehicle is a hybrid vehicle which can run by only using a motor;

an upper limit of a required drive output power is set so as to determine whether running of the vehicle by only using the motor can be continued;

while the inter-vehicle-distance maintenance mode is executed, a difference between the inter-vehicle distance (e.g., an inter-vehicle distance D in the embodiment), which is measured when the amount of variation in the degree of depression of the accelerator pedal exceeds the predetermined third range in the previous execution of the inter-vehicle-distance maintenance mode, and a target value (e.g., a target inter-vehicle distance DTG in the embodiment) of the inter-vehicle distance set in the previous execution of the inter-vehicle-distance maintenance mode is determined as a control maintenance permissive value (e.g., a permissive delta inter-vehicle distance DDTGL in the embodiment) (refer to step S216 in the embodiment); and when the sum of a target value of the inter-vehicle distance set in the present execution of the inter-vehicle-distance maintenance mode and the control maintenance permissive value is larger than a present value of the inter-vehicle distance (e.g., executed when "YES" in step S404 in the embodiment), and the required drive output power with respect to the motor is larger than the upper limit (e.g., executed when "YES" in step S405 in the embodiment), the required drive output power is set to the upper limit (refer to step S406 in the embodiment).

In accordance with the above structure, when the vehicle runs in the inter-vehicle-distance maintenance mode regardless of variation in degree of depression of the accelerator pedal, the difference between the inter-vehicle distance targeted by the driver and the set target value can be grasped as the control maintenance permissive value. When sum of the target value of the inter-vehicle distance and the control maintenance permissive value is larger than the present inter-vehicle distance, even if the required drive output power with respect to the motor is larger than the upper limit, the required drive output power is set to the upper limit, and the vehicle can run using the motor.

In accordance with the above three cases, frequency of performing the running using the motor can be increased, thereby improving the fuel consumption.

In addition, the control maintenance permissive value is set when the amount of variation in the degree of depression of the accelerator pedal exceeds the relevant predetermined range, it is possible to perform running which is satisfactory for each running operation and for each driver, thereby resulting in improvement of salability.

In a preferable example:
the vehicle can execute a cylinder stop operation in which cylinders of an engine are partially stopped;
an upper limit (e.g., an upper-limit driving force FCYL3 for implementing a cylinder-stop operation mode in the embodiment) of a required value of the driving force (e.g., a required driving force FREQF (for the forward movement) in the embodiment) is set so as to determine whether the cylinder stop operation can be continued;
while the driving-force maintenance mode is executed, a difference between the driving force (e.g., the present driving force FACT in the embodiment), which is measured when the amount of variation in the degree of depression of the accelerator pedal exceeds the predetermined first range in the previous execution of the driving-force maintenance mode, and a target value (e.g., the target driving force FTG in the embodiment) of the driving force set in the previous execution of the driving-force maintenance mode is determined as a control maintenance permissive value (e.g., the permissive delta driving force DFTGL in the embodiment) (refer to step S214 in the embodiment); and
when a difference between a target value of the driving force set in the present execution of the driving-force maintenance mode and the control maintenance permissive value is larger than a present value of the required value of the driving force (e.g., executed when "YES" in step S507 in the embodiment), and the required value of the driving force is larger than the upper limit (e.g., executed when "YES" in step S508 in the embodiment), the required value is set to the upper limit (refer to step S509 in the embodiment).

In accordance with the above structure, when the vehicle runs in the driving-force maintenance mode regardless of variation in degree of depression of the accelerator pedal, the difference between the driving force targeted by the driver and the set target value can be grasped as the control maintenance permissive value. When the difference between the target value of the driving force and the control maintenance permissive value is larger than the present required value of the driving force, even if the required value of the driving force is larger than the upper limit, the required value is set to the upper limit, and the vehicle can run in the cylinder stop operation mode.

In another preferable example:
the vehicle can execute a cylinder stop operation in which cylinders of an engine are partially stopped;
an upper limit (e.g., an upper-limit driving force FCYL3 for implementing a cylinder-stop operation mode in the embodiment) of a required value of the driving force (e.g., a required driving force FREQF (for the forward movement) in the embodiment) is set so as to determine whether the cylinder stop operation can be continued;
while the vehicle-speed maintenance mode is executed, a difference between the vehicle speed (e.g., the vehicle speed VP in the embodiment), which is measured when the amount of variation in the degree of depression of the accelerator pedal exceeds the predetermined second range in the previous execution of the vehicle-speed maintenance mode, and a target value (e.g., the target vehicle speed VPTG in the embodiment) of the vehicle speed set in the previous execution of the vehicle-speed maintenance mode is determined as a control maintenance permissive value (e.g., the permissive delta vehicle speed DVPTGL in the embodiment) (refer to step S217 in the embodiment); and
when a difference between a target value of the vehicle speed set in the present execution of the vehicle-speed maintenance mode and the control maintenance permissive value is smaller than a present value of the vehicle speed (e.g., executed when "YES" in step S510 in the embodiment), and the required value of the driving force is larger than the upper limit (e.g., executed when "YES" in step S511 in the embodiment), the required value is set to the upper limit (refer to step S512 in the embodiment).

In accordance with the above structure, when the vehicle runs in the vehicle-speed maintenance mode regardless of variation in degree of depression of the accelerator pedal, the difference between the vehicle speed targeted by the driver and the set target value can be grasped as the control maintenance permissive value. When the difference between the target value of the vehicle speed and the control maintenance permissive value is smaller than the present required value of the vehicle speed, even if the required value of the driving force is larger than the upper limit, the required value is set to the upper limit, and the vehicle can run in the cylinder stop operation mode.

In another preferable example:
the vehicle can execute a cylinder stop operation in which cylinders of an engine are partially stopped;
an upper limit of a required value of the driving force is set so as to determine whether the cylinder stop operation can be continued;
while the inter-vehicle-distance maintenance mode is executed, a difference between the inter-vehicle distance (e.g., the inter-vehicle distance D in the embodiment), which is measured when the amount of variation in the degree of depression of the accelerator pedal exceeds the predetermined third range in the previous execution of the inter-vehicle-distance maintenance mode, and a target value (e.g., the target inter-vehicle distance DTG in the embodiment) of the inter-vehicle distance set in the previous execution of the inter-vehicle-distance maintenance mode is determined as a control maintenance permissive value (e.g., the permissive delta inter-vehicle distance DDTGL in the embodiment) (refer to step S216 in the embodiment); and
when the sum of a target value of the inter-vehicle distance set in the present execution of the inter-vehicle-distance maintenance mode and the control maintenance permissive value is larger than a present value of the inter-vehicle distance (e.g., executed when "YES" in step S504 in the embodiment), and the required value of the driving force is larger than the upper limit (e.g., executed when "YES" in step S505 in the embodiment), the required value is set to the upper limit (refer to step S506 in the embodiment).

In accordance with the above structure, when the vehicle runs in the inter-vehicle-distance maintenance mode regardless of variation in degree of depression of the accelerator pedal, the difference between the inter-vehicle distance targeted by the driver and the set target value can be grasped as the control maintenance permissive value. When sum of the target value of the inter-vehicle distance and the control maintenance permissive value is larger than the present inter-vehicle distance, even if the required value of the driving force is larger than the upper limit, the required value is set to the upper limit, and the vehicle can run in the cylinder stop operation mode.

In accordance with the above three preferable examples, frequency of performing the cylinder stop operation can be increased, thereby improving the fuel consumption.

In addition, the control maintenance permissive value is set when the amount of variation in the degree of depression of the accelerator pedal exceeds the relevant predetermined range, it is possible to perform running which is satisfactory for each running operation and for each driver, thereby resulting in improvement of salability.

The present invention also provides a running control apparatus for a vehicle, wherein the control apparatus controls a state of running using a driving source for generating a driving force of the vehicle, and comprises:

an operation target determination device (refer to step S400 (S107, S108, S109, S119, and S129) in the embodiment) for determining whether a depressing operation of an accelerator pedal of the vehicle is performed for an operation target which is one of maintenance of the driving force, maintenance of a vehicle speed of the vehicle, and maintenance of an inter-vehicle distance between the present vehicle and a vehicle ahead thereof, and a maintenance device (refer to step S600 (S313, S316, and S310) in the embodiment) for performing the operation target, which is determined by the operation target determination device, when it is determined that one of the maintenance of the driving force, the maintenance of the vehicle speed, and the maintenance of the inter-vehicle distance is targeted, wherein the maintenance device performs the operation target regardless of the depressing operation of the accelerator pedal.

In accordance with the above structure, maintenance of the driving force, the vehicle speed, and the inter-vehicle distance (between the present vehicle and a vehicle ahead thereof), targeted by the driver, is provided, and simultaneously, it is possible to prevent a variation in the amount of supplied fuel, caused by a variation in the degree of depression of the accelerator pedal, which is involuntarily performed by the driver. Therefore, the fuel consumption can be improved.

In a typical example:

the vehicle is a hybrid vehicle which can run by only using a motor;

an upper limit of a required drive output power is set so as to determine whether running of the vehicle by only using the motor can be continued;

when it is determined by the operation target determination device that none of the maintenance of the driving force, the maintenance of the vehicle speed, and the maintenance of the inter-vehicle distance is targeted, a first difference between a target value of the driving force and a driving force corresponding to a present degree of depression of the accelerator pedal, a second difference between a target value and a present value of the vehicle speed, and a third difference between a target value and a present value of the inter-vehicle distance are respectively set as a first control-maintenance permissive value, a second control-maintenance permissive value, and a third control-maintenance permissive value;

when it is determined by the operation target determination device that the maintenance of the driving force is targeted, and a difference between the target value of the driving force and the first control-maintenance permissive value is larger than a present required value of the driving force, if the required drive output power with respect to the motor is larger than the upper limit, the required drive output power is set to the upper limit;

when it is determined by the operation target determination device that the maintenance of the vehicle speed is targeted, and a difference between the target value of the vehicle speed and the second control-maintenance permissive value is smaller than the present value of the vehicle speed, if the required drive output power with respect to the motor is larger than the upper limit, the required drive output power is set to the upper limit; and when it is determined by the operation target determination device that the maintenance of the inter-vehicle distance is targeted, and the sum of the target value of the inter-vehicle distance and the third control-maintenance permissive value is larger than the present value of the inter-vehicle distance, if the required drive output power with respect to the motor is larger than the upper limit, the required drive output power is set to the upper limit.

Therefore, when the above-described conditions are satisfied, and the required drive output power with respect to the motor is larger than the upper limit, the required drive output power can be set to the upper limit, and running using the motor can be performed. Accordingly, frequency of performing the running using the motor can be increased, thereby improving the fuel consumption.

In another typical example:

the vehicle can execute a cylinder stop operation in which cylinders of an engine are partially stopped;

an upper limit of a required value of the driving force is set so as to determine whether the cylinder stop operation can be continued;

when it is determined by the operation target determination device that none of the maintenance of the driving force, the maintenance of the vehicle speed, and the maintenance of the inter-vehicle distance is targeted, a first difference between a target value of the driving force and a driving force corresponding to a present degree of depression of the accelerator pedal, a second difference between a target value and a present value of the vehicle speed, and a third difference between a target value and a present value of the inter-vehicle distance are respectively set as a first control-maintenance permissive value, a second control-maintenance permissive value, and a third control-maintenance permissive value;

when it is determined by the operation target determination device that the maintenance of the driving force is targeted, and a difference between the target value of the driving force and the first control-maintenance permissive value is larger than the required value of the driving force, if the required value of the driving force is larger than the upper limit, the required value is set to the upper limit;

when it is determined by the operation target determination device that the maintenance of the vehicle speed is targeted, and a difference between the target value of the vehicle speed and the second control-maintenance permissive value is smaller than the present value of the vehicle speed, if the required value of the driving force is larger than the upper limit, the required value is set to the upper limit; and when it is determined by the operation target determination device that the maintenance of the inter-vehicle distance is targeted, and the sum of the target value of the inter-vehicle distance and the third control-maintenance permissive value is larger than the present value of the inter-vehicle distance, if the required value of the driving force is larger than the upper limit, the required value is set to the upper limit.

Therefore, when the above-described conditions are satisfied, and the required value of the driving force is larger than the upper limit, the required value can be set to the upper limit, and the vehicle can run in the cylinder stop operation mode. Accordingly, frequency of performing the cylinder stop operation can be increased, thereby improving the fuel consumption.

BRIEF DESCRIPTION OF THE DRAWINGS

FIG. 2 is a schematic diagram explaining a start (initial starting) mode.

FIG. 3 is a schematic diagram explaining a start (EV starting) mode.

FIG. 4 is a schematic diagram explaining an E-PASS EV mode.

FIG. 5 is a schematic diagram explaining a BATT EV mode.

FIG. 6 is a schematic diagram explaining an S-REGEN mode.

FIG. 7 is a schematic diagram explaining a CHARGE EV mode.

FIG. 8 is a schematic diagram explaining an IDLE stop mode.

FIG. 9 is a schematic diagram explaining an IDLE mode.

FIG. 14 is a schematic diagram explaining a cylinder stop lock-up +ANV mode.

FIG. 15 is a schematic diagram explaining a V6 lock-up S-ASSIST mode.

FIG. 16 is a schematic diagram explaining a cylinder stop lock-up S-ASSIST mode.

FIG. 17 is a schematic diagram explaining a cylinder stop lock-up S-ASSIST +ANV mode.

DETAILED DESCRIPTION OF THE INVENTION

Hereinafter, an embodiment in accordance with the present invention will be described with reference to the appended figures.

Figure 1:
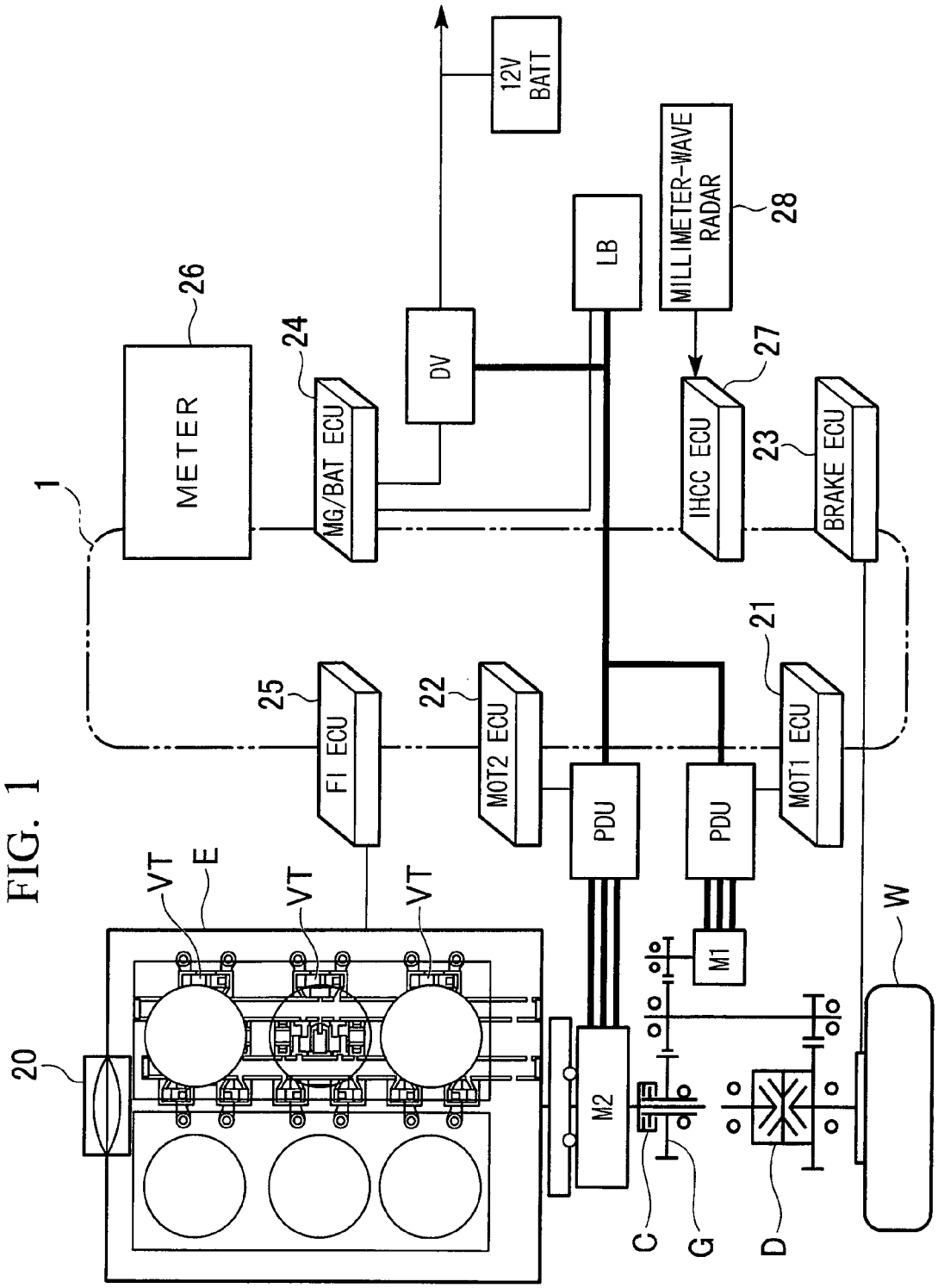
FIG. 1 is a schematic diagram showing the general structure of a hybrid vehicle with respect to an embodiment of the present invention.

FIG. 1 shows the structure of a hybrid vehicle with respect to an embodiment of the present invention. This hybrid vehicle can run using only a first motor M1. A second motor M2 is coupled with a crank shaft of a V6 cylinder engine E. A speed change gear box G is connected to the second motor M2 via a clutch C.

The speed change box G is, for example, a 5-speed gear box, and transmits a driving force to right and left driving (front or rear) wheels W of the vehicle via a final gear and a differential gear D for distributing the driving force between the right and left driving wheels W. The first motor M1 cooperates with the final gear, and transmits power via the final gear and the differential gear D, to the driving wheels W.

The first motor M1 and the second motor M2 each may be a three-phase DC brushless motor, and are connected to a power drive unit PDU. To each power drive unit PDU, a high-voltage Li-ion battery LB is connected, which sends and receives electrical energy to and from the corresponding motor (M1 or M2).

In a control operation explained below, the first motor M1 and the second motor M2 are set in a manner such that their operation ranges overlap at around 3000 rpm, which is known as the most efficient speed of the motor, and both motors can operate within a range defined around the overlapped area. The active motor (i.e., which is presently used) is selected mainly in accordance with a vehicle speed VP (a speed of the vehicle). More specifically, a motor system is constructed in a manner such that the first motor M1 is highly efficient in a relatively low vehicle-speed range while the second motor M2 is highly efficient in a relatively high vehicle-speed range.

The driving and regenerating operation of each of the motors M1 and M2 is performed by the corresponding power drive unit PDU which receives a control command issued by a control part 1. For example, in order to drive the first motor M1, the power drive unit PDU converts DC (direct current) electric power, which is output from the battery LB, to three-phase AC (alternating current) electric power, and supplies the power to the first motor M1, in accordance with a torque command issued by the control part 1. In order to perform regeneration via the first motor M1, the power drive unit PDU converts the three-phase AC electric power, which is supplied from the first motor M1, to DC electric power, and charges the battery LB with the DC electric power.

A 12V auxiliary battery "12V BATT" for driving various accessories (which function as "12V consumers") is connected in parallel to each power drive unit PDU and the battery LB via a so-called "downverter" DB which is a DC-DC converter. The downverter DB, controlled by the control part 1, charges the 12V auxiliary battery "12V BATT" by dropping the voltage of each power drive unit PDU or the battery LB.

As described above, the engine E is a V6 cylinder engine, and it has two banks. Three cylinders belong to one of the banks, and each of the three cylinders has a hydraulic variable-timing valve mechanism VT which enables a cylinder stop (or idle) operation. The other three cylinders belong to the other bank, and each of the three cylinders has an ordinary valve operation mechanism (not shown) which performs no cylinder stop operation. In the present embodiment, each of the three cylinders (which enable the cylinder stop operation) performs the cylinder stop operation using two intake valves and two exhaust valves, all of which maintain a closed state via the corresponding hydraulic variable-timing valve mechanism VT.

Accordingly, the operation of the engine E is switched between a three-cylinder operation (i.e., a cylinder stop operation) in which the three cylinders belonging to said one of the banks are stopped, and a six-cylinder operation (i.e., a V6 operation or a normal fuel-consumption mode) in which all of the six cylinders belonging to both banks are active.

In addition, a vibration of the engine E, which is generated when the engine E operates in the three-cylinder operation (i.e., cylinder stop operation), is cancelled by using the second motor M2. It is of course possible to further provide an active engine mount for suppressing a vibration of the vehicle body.

The engine E has an electronic control throttle 20 for electronically controlling a throttle valve (not shown).

The electronic control throttle 20 directly controls the throttle valve in accordance with a degree of opening of the throttle valve, which is calculated by the control part 1 based on, for example, an accelerator-pedal opening degree AP corresponding to the degree of depression of an accelerator pedal (not shown) by the driver of the vehicle, the driving state of the vehicle such as the vehicle speed VP or an engine (rotation) speed NE of the engine E, and a torque distribution state between the engine E and the first motor M1 or the second motor M2.

To the control part 1, signals output from the following devices are input, such as (i) a vehicle speed sensor for measuring the vehicle speed VP, (ii) an engine water temperature sensor for measuring a temperature of water for the engine E (i.e., engine water temperature TW), (iii) a catalyst temperature sensor for measuring a catalyst temperature CAT, (iv) an engine speed sensor for measuring the engine speed NE, (v) a shift position sensor for detecting each shift position such as a front gear F, a rear gear R, a parking gear P, or a neutral gear N, (vi) a brake switch for determining the operation state of a brake pedal BR, (vii) an accelerator pedal opening-degree sensor for measuring the accelerator-pedal opening degree AP corresponding to the degree of depression of the accelerator pedal, (viii) a throttle opening-degree sensor for measuring a throttle opening degree TH, (ix) an intake-pipe nega-tive-pressure sensor for measuring an intake-pipe negative pressure PB, (x) a battery temperature sensor for measuring a temperature TBAT of the battery LB, and (xi) a POIL sensor for measuring an oil pressure of a side where the cylinder stop operation is released while the cylinder stop operation is performed, and the like.

The control part 1 includes: (i) a MOT1 ECU (electronic control unit) 21 for controlling the driving and regenerating operation of the first motor M1 via the corresponding power drive unit PDU, (ii) a MOT2 ECU 22 for controlling the driving and regenerating operation of the second motor M2 via the corresponding power drive unit PDU, (iii) a BRAKE ECU 23 for controlling a brake device so as to stabilize the movement of the vehicle, (iv) an MG/BAT ECU 24 for monitoring and protecting a high-voltage electrical equipment system which may include the power drive unit PDUs, the battery LB, the downverter DV, the first motor M1, and the second motor M2, and controlling the operation of the power drive unit PDUs and the downverter DV, and (v) an FI ECU 25 for controlling the fuel supply to the engine E, the ignition timing, and the like. The above ECUs 21 to 25 are connected to a meter 26 which includes instruments for showing various state quantities. Reference numeral 27 indicates an IHCC (intelligent highway cruise control) ECU, which can compute an inter-vehicle distance from the present vehicle to a vehicle ahead thereof, based on a signal output from a millimeter-wave radar 28, while the present vehicle runs.

The operation modes of the present embodiment will be explained with reference to FIGS. 2 to 19.

The present hybrid vehicle has two general modes: one is active when the clutch C is connected (i.e., ON), that is, in a lock-up state (in which the crank shaft of the engine E and the speed change box G are directly coupled via the second motor M2), and the other is active when the clutch C is disconnected (i.e., OFF).

In addition to the state of the clutch C, the operation mode is switched between various modes, in accordance with:
(i) whether the engine E is (a) in the full-cylinder operation (i.e., V6 operation) mode, (b) in the three-cylinder operation (i.e., cylinder stop) mode, or (c) stopped,
(ii) whether the first motor M1 is (a) generating a driving force, (b) generating electric power while the engine is stopped (i.e., in the regeneration mode), (c) generating electric power while the engine operates, (d) stopping, or (e) rotating, where the generated torque is zero,
(iii) whether the second motor M2 is (a) generating a driving force, (b) generating electric power while the engine is stopped (i.e., in the regeneration mode), (c) generating electric power while the engine operates, (d) stopping, (e) rotating, where the generated torque is zero, or (f) in a vibration control mode (called "ANV"), or
(iv) whether the battery LB is (a) discharging, (b) charging, or (c) in a zero battery-end state (i.e., not discharging nor charging) which includes using the battery LB by alternating the charging and discharging so as to drive the second motor M2 in the vibration control mode.

FIG. 2 shows a START (or initial starting) mode. In this operation mode, the clutch C is disconnected, the engine E is stopped, the first motor M1 is stopped, the second motor M2 is generating a driving force, and the battery LB is discharging. That is, the engine E is started when the vehicle stands completely still. When the vehicle is started by switching an ignition key (or switch) on, electric power is supplied from the battery LB so as to drive the second motor M2 and start the engine E, and simultaneously, electric power is supplied via the downverter DV to the above-described 12V consumers and the 12V auxiliary battery "12V BATT".

FIG. 3 shows a START (EV starting) mode. In this operation mode, the clutch C is disconnected, the engine E is stopped, the first motor M1 and the second motor M2 each are generating a driving force, and the battery LB is discharging. That is, when the clutch C is disconnected, the engine E is stopped, and the vehicle runs using the first motor M1, electric power is supplied from the battery LB so as to drive the second motor M2 and to start the engine E, and simultaneously, electric power is supplied via the downverter DV to the above-described 12V consumers and the 12V auxiliary battery "12V BATT".

FIG. 4 shows an E-PASS EV mode. In this operation mode, the clutch C is disconnected, the engine E operates in the V6 operation mode, the first motor M1 is generating a driving force, the second motor M2 is generating electric power, and the battery LB is in the zero battery-end state. That is, the vehicle runs by driving the first motor M1 by using the electric power generated by the second motor M2, and simultaneously, electric power is supplied via the downverter DV to the above-described 12V consumers and the 12V auxiliary battery "12V BATT".

If the reverse position R is detected by the shift position sensor, the first motor M1 is reversely rotated so that the vehicle moves backward (i.e., in an E-PASS EV REVERSE mode).

FIG. 5 shows a BATT EV mode. In this operation mode, the clutch C is disconnected, the engine E is stopped, the first motor M1 is generating a driving force, the second motor M2 is stopped, and the battery LB is discharging. This mode is used when, for example, the efficiency of electric power generation is low, and in this mode, the vehicle runs by driving the first motor M1 by only using the electric power supplied by the battery LB.

When the reverse position R is detected by the shift position sensor and the first motor M1 is reversely rotated, the vehicle moves backward (i.e., in a BATT EV REVERSE mode).

FIG. 6 shows an S-REGEN mode. In this operation mode, the clutch C is disconnected, the engine E is stopped, the first motor M1 is generating electric power (i.e., in the regeneration mode), the second motor M2 is stopped, and the battery LB is charging. That is, regeneration is performed using the first motor M1 while the vehicle is decelerated, and electric power is supplied via the battery LB and the downverter DV to the above-described 12V consumers and the 12V auxiliary battery "12V BATT". In this mode, it is possible to obtain a maximum quantity of regeneration by omitting resistance due to the operation of the engine E or the second motor M2. Here, "S" in the S-REGEN mode is an abbreviation of "series", and indicates that the first motor M1 participates in the operation. In addition, "REGEN" indicates regeneration.

FIG. 7 shows a CHARGE EV mode. In this operation mode, the clutch C is disconnected, the engine E operates in the V6 operation mode, the first motor M1 is generating a driving force, the second motor M2 is generating electric power, and the battery LB is charging. That is, the second motor M2 generates electric power by which the vehicle runs via the first motor M1 and the battery LB is charged, and the electric power is also supplied via the downverter DV to the above-described 12V consumers and the 12V auxiliary battery "12V BATT".

FIG. 8 shows an IDLE stop mode. In this operation mode, the clutch C is disconnected, the engine E is stopped, the first motor M1 is stopped, the second motor M2 is also stopped, and the battery LB is discharging. That is, electric power is supplied from the battery LB via the downverter DV to the above-described 12V consumers and the 12V auxiliary battery "12V BATT".

FIG. 9 shows an IDLE mode. In this operation mode, the clutch C is disconnected, the engine E operates in the V6 operation mode, the first motor M1 is stopped, the second motor M2 is generating electric power, and the battery LB is in the zero battery-end state. That is, the second motor M2 generates electric power which is supplied via the downverter DV to the above-described 12V consumers and the 12V auxiliary battery "12V BATT".

Figure 10:
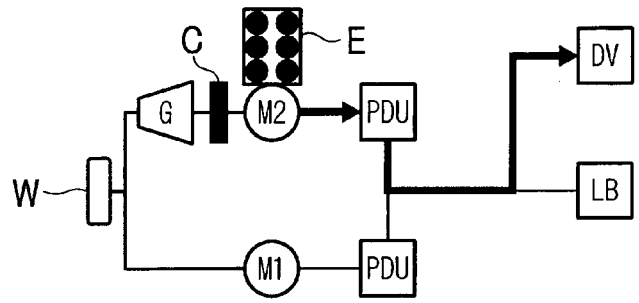
FIG. 10 is a schematic diagram explaining a V6 lock-up mode.

FIG. 10 shows a V6 lock-up mode. In this operation mode, the clutch C is connected, the engine E operates in the V6 operation mode, the first motor M1 is rotating while the generated torque is zero, the second motor M2 is generating electric power, and the battery LB is in the zero battery-end state. That is, the second motor M2 generates electric power which is supplied via the downverter DV to the above-described 12V consumers and the 12V auxiliary battery "12V BATT", and the vehicle runs by the engine E.

Figure 11:
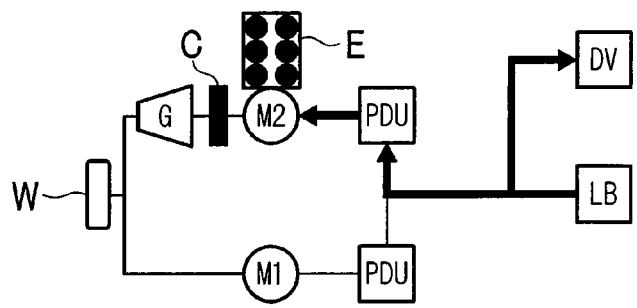
FIG. 11 is a schematic diagram explaining a V6 lock-up P-ASSIST mode.

FIG. 11 shows a V6 lock-up P-ASSIST mode. In this operation mode, the clutch C is connected, the engine E operates in the V6 operation mode, the first motor M1 is rotating while the generated torque is zero, the second motor M2 is generating a driving force, and the battery LB is discharging. That is, when a load of the vehicle slightly increases while the vehicle runs in the V6 lock-up mode, driving force of the engine E is assisted by the second motor M2 using the electric power supplied from the battery LB, and simultaneously, the electric power from the battery LB is supplied via the downverter DV to the above-described 12V consumers and the 12V auxiliary battery "12V BATT", so that the vehicle runs. Here, "P" in "P-ASSIST" is an abbreviation of "parallel", and indicates that the second motor M2 participates in the operation, and "ASSIST" indicates the above assistance.

Figure 12:
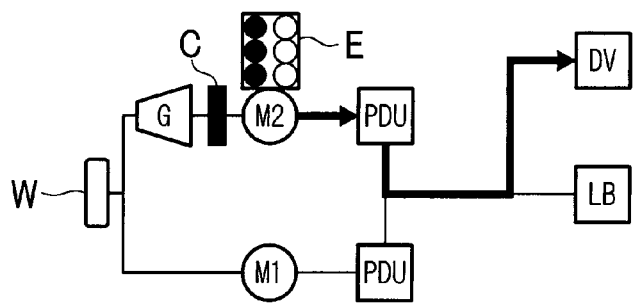
FIG. 12 is a schematic diagram explaining a cylinder stop lock-up mode.

FIG. 12 shows a cylinder stop lock-up mode. In this operation mode, the clutch C is connected, the engine E operates in the cylinder stop mode, the first motor M1 is rotating while the generated torque is zero, the second motor M2 is generating electric power, and the battery LB is in the zero battery-end state. That is, when the load of the vehicle decreases while the vehicle runs in the V6 lock-up mode, the engine E is operated in the cylinder stop mode, and the electric power generated by the second motor M2 is supplied via the downverter DV to the above-described 12V consumers and the 12V auxiliary battery "12V BATT", so that the vehicle runs using the engine E.

Figure 13:
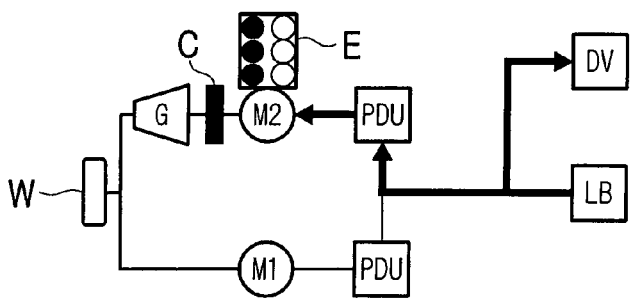
FIG. 13 is a schematic diagram explaining a cylinder stop lock-up P-ASSIST mode.

FIG. 13 shows a cylinder stop lock-up P-ASSIST mode. In this operation mode, the clutch C is connected, the engine E operates in the cylinder stop mode, the first motor M1 is rotating while the generated torque is zero, the second motor M2 is generating a driving force, and the battery LB is discharging. That is, when the load of the vehicle slightly increases while the vehicle runs in the cylinder stop lock-up mode, it is determined whether the engine E can be assisted while the cylinder stop operation is continued. If it can, driving force of the engine E, which is still in the cylinder stop mode, is assisted by the second motor M2 using the electric power from the battery LB, which is also supplied via the downverter DV to the above-described 12V consumers and the 12V auxiliary battery "12V BATT", so that the vehicle runs.

FIG. 14 shows a cylinder stop lock-up +ANV mode. In this operation mode, the clutch C is connected, the engine E operates in the cylinder stop mode, the first motor M1 is rotating while the generated torque is zero, the second motor M2 is in the vibration control mode, and the battery LB is in the zero battery-end state. That is, part of the electric power generated by the second motor M2 is supplied via the downverter DV to the above-described 12V consumers and the 12V auxiliary battery "12V BATT", and simultaneously, a driving force generated by the second motor M2 is used for controlling and canceling a vibration (or noise) of the engine E, which is caused by the cylinder-stop operation. In this case, as shown by dashed arrows in FIG. 14, the first motor M1 may be driven using part of the electric power generated by the second motor M2. Additionally, "ANV" indicates vibration control.

FIG. 15 shows a V6 lock-up S-ASSIST mode. In this operation mode, the clutch C is connected, the engine E operates in the V6 operation mode, the first motor M1 is generating a driving force, the second motor M2 is rotating while the generated torque is zero, and the battery LB is discharging. That is, when the load of the vehicle increases while the vehicle runs in the V6 operation mode, the first motor M1 is driven using the electric power supplied from the battery LB, so as to assist the driving force of the engine E, and simultaneously, the electric power from the battery LB is also supplied via the downverter DV to the above-described 12V consumers and the 12V auxiliary battery "12V BATT", so that the vehicle runs.

FIG. 16 shows a cylinder stop lock-up S-ASSIST mode. In this operation mode, the clutch C is connected, the engine E operates in the cylinder stop mode, the first motor M1 is generating a driving force, the second motor M2 is rotating while the generated torque is zero, and the battery LB is discharging. That is, when the load of the vehicle slightly increases while the vehicle runs in the cylinder stop lock-up mode, it is determined whether the engine E can be assisted while the cylinder stop operation is continued. If it can, driving force of the engine E, which is still in the cylinder stop mode, is assisted by the first motor M1 using the electric power from the battery LB, which is also supplied via the downverter DV to the above-described 12V consumers and the 12V auxiliary battery "12V BATT", so that the vehicle runs.

FIG. 17 shows a cylinder stop lock-up S-ASSIST +ANV mode. In this operation mode, the clutch C is connected, the engine E operates in the cylinder stop mode, the first motor M1 is generating a driving force, the second motor M2 is in the vibration control mode, and the battery LB is discharging. That is, the first motor M1 is driven so as to assist the driving force of the engine E, and the second motor M2 is used for controlling and canceling the vibration of the engine E.

Here, the second motor M2 may be used for performing the driving force assistance and the vibration control. However, in this case, one of the driving force assistance and the vibration control is restricted. Therefore, in the present mode, the driving force assistance and the vibration are distributed between the first motor M1 and the second motor M2 in the cylinder stop running operation, so that they can be performed without providing any restriction to each other. Accordingly, a (driving force) assistance range in the cylinder stop operation can be enlarged, so that frequency of modeshift to the V6 operation is reduced, thereby improving the fuel consumption.

Figure 18:
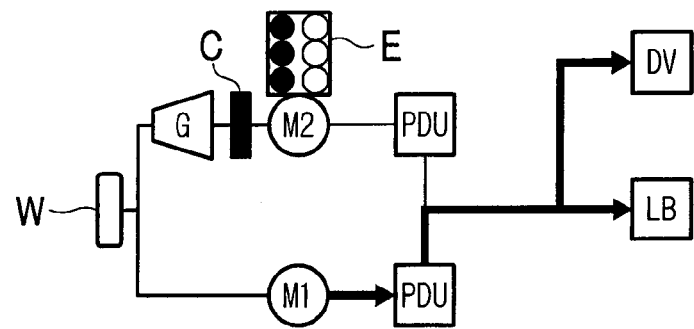
FIG. 18 is a schematic diagram explaining a cylinder stop lock-up S-REGEN mode.

FIG. 18 shows a cylinder stop lock-up S-REGEN mode. In this operation mode, the clutch C is connected, the engine E operates in the cylinder stop mode, the first motor M1 is generating electric power (i.e., in the regeneration mode), the second motor M2 is rotating while the generated torque is zero, and the battery LB is charging.

Figure 19:
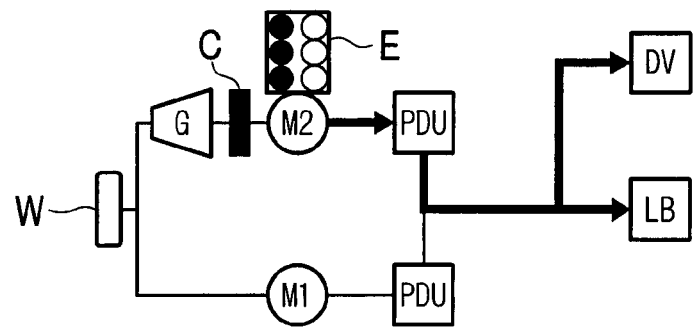
FIG. 19 is a schematic diagram explaining a cylinder stop lock-up P-REGEN mode.

FIG. 19 shows a cylinder stop lock-up P-REGEN mode. In this operation mode, the clutch C is connected, the engine E operates in the cylinder stop mode, the first motor M1 is rotating while the generated torque is zero, the second motor M2 is generating electric power (i.e., in the regeneration mode), and the battery LB is charging.

Below, an operation determination process for determining the operation mode will be explained with reference to a flowchart shown in FIGS. 20 and 21.

In the first step S001, it is determined whether the shift position is the R (reverse) position. When the result of the determination is "YES", the operation proceeds to step S013, and when it is "NO", the operation proceeds to step S002.

In step S013, a required driving force FREQR (for the backward movement) is retrieved from a map (i.e., a map search is performed) based on the vehicle speed VP and the accelerator-pedal opening degree AP, and in the following step S014, a required drive output power PREQ is computed in accordance with the vehicle speed VP and the required driving force FREQR (for the backward movement). The operation then proceeds to step S015.

In step S015, a permissive upper-limit drive output power PREQLMT for the driving operation in the BATT EV mode is retrieved from a map, based on an amount of remaining power (called "SOC") of the battery LB.

In the following step S016, it is determined whether the required drive output power PREQ is higher than the permissive upper-limit drive output power PREQLMT. When the result of the determination is "YES", the operation proceeds to step S019, and when it is "NO", the operation proceeds to step S017.

In step S019, the E-PASS EV REVERSE mode (see FIG. 4) is selected, and the process of the present flowchart is terminated. This mode is selected because no electric power is supplied from the battery LB, and thus the required drive output power must be obtained by operating the engine E.

In step S017, it is determined whether the engine water temperature TW is higher than a lower-limit engine water temperature TWEV for making the vehicle run in the BATT EV mode. When the result of the determination is "YES", the operation proceeds to step S018, and when it is "NO", the operation proceeds to step S019. The above determination is executed because when the engine water temperature TW is low, the engine E should be started. The above lower-limit engine water temperature TWEV has an identical value to a lower-limit engine water temperature for executing the idle stop operation, which is explained later.

In step S018, it is determined whether the catalyst temperature CAT is higher than a lower-limit catalyst temperature TCATEV for making the vehicle run in the BATT EV mode. When the result of the determination is "YES", the operation proceeds to step S020, and when it is "NO", the operation proceeds to step S019.

In step S020, the BATT EV REVERSE mode (see FIG. 5) is selected, and the process of the present flowchart is terminated. This mode is selected because when the catalyst temperature CAT is low, the engine E should be started. The above lower-limit catalyst temperature TCATEV has an identical value to a lower-limit catalyst temperature for executing an idle stop operation, which is explained later.

In step S002, it is determined whether the shift position is the P (parking) or N (neutral) position. When the result of the determination is "YES", the operation proceeds to step S021, and when it is "NO", the operation proceeds to step S003.

In step S021, it is determined whether the amount SOC of remaining power of the battery LB is larger than a lower-limit SOCIDLE for executing the idle stop operation. This determination is performed so as to determine whether the amount SOC is sufficient for executing the idle stop operation. When the result of the determination in step S021 is "YES", the operation proceeds to step S022, and when it is "NO", the operation proceeds to step S024. In step S024, the IDLE mode (see FIG. 9) is selected, and the process of the present flowchart is terminated.

In step S022, it is determined whether the engine water temperature TW is higher than the lower-limit engine water temperature TWEV for executing the idle stop operation. When the result of the determination is "YES", the operation proceeds to step S023, and when it is "NO", the operation proceeds to step S024.

In step S023, it is determined whether the catalyst temperature CAT is higher than the lower-limit catalyst temperature TCATEV for executing the idle stop operation. When the result of the determination is "YES", the operation proceeds to step S025, and when it is "NO", the operation proceeds to step S024. In step S025, the IDLE stop mode (see FIG. 8) is selected, and the process of the present flowchart is terminated.

In step S003, it is determined whether a braking operation has been performed. When the result of the determination is "YES", the operation proceeds to step S004, and when it is "NO", the operation proceeds to step S005.

In step S004, it is determined whether the vehicle speed VP is zero. When the result of the determination is "YES", the vehicle stands still, and the operation proceeds to step S021. When the result of the determination is "NO", the vehicle is running and the operation proceeds to step S005.

In step S005, a required driving force FREQF (for the forward movement) is retrieved from a map (i.e., a map search is performed) based on the vehicle speed VP and the accelerator-pedal opening degree AP, and in the following step S006, the required drive output power PREQ is computed in accordance with the vehicle speed VP and the required driving force FREQF (for the forward movement). The operation then proceeds to step S007.

In step S007, it is determined whether the required driving force FREQF (for the forward movement) is less than zero. When the result of the determination is "YES" (i.e., in deceleration), the operation proceeds to step S026, and when it is "NO", the operation proceeds to step S008.

In step S026, it is determined whether the vehicle speed VP is higher than a lock-up clutch fastening lower-limit vehicle speed VPLC for fastening the clutch C. When the result of the determination is "YES" (i.e., the vehicle speed VP has a value for implementing the lock-up state), the operation proceeds to step S027, and when it is "NO" (i.e., the lock-up state cannot be implemented by the vehicle speed VP), the operation proceeds to step S029.

In step S029, the S-REGEN mode (see FIG. 6) is selected, and the process of the present flowchart is terminated.

In step S027, it is determined whether the lock-up state is active. When the result of the determination is "YES", the operation proceeds to step S028, and when it is "NO", the operation proceeds to step S029. This determination is performed because in the vehicle having a high vehicle speed and a disconnected clutch, a larger amount of loss occurs by increasing the engine speed NE so as to implement the lock-up state, and it is preferable to select the S-REGEN mode (see FIG. 6) in step S029 without performing such an operation.

In step S028, it is determined whether the vehicle speed VP is lower than a lock-up clutch fastening lower-limit vehicle speed VPDECLCL defined for deceleration. This determination is performed so as to determine whether the regeneration should be performed using the first motor M1 or the second motor M2, in consideration of the efficiency of the motor. When the result of the determination in step S028 is "YES", the operation proceeds to step S030, and when it is "NO", the operation proceeds to step S031.

In step S030, the cylinder stop lock-up S-REGEN mode (see FIG. 18) is selected, and the process of the present flowchart is terminated. In step S031, the cylinder stop lock-up P-REGEN mode (see FIG. 19) is selected, and the process of the present flowchart is terminated. The above selection is performed because (i) with respect to the second motor M2, the higher the rotation speed (i.e., the vehicle speed), the higher the efficiency, and (ii) with respect to the first motor M1, the lower the rotation speed (i.e., the vehicle speed), the higher the efficiency.

In step S008, it is determined whether the vehicle speed VP is higher than the lock-up clutch fastening lower-limit vehicle speed VPLC. This determination is performed because the lock-up connection cannot be executed until the vehicle speed reaches a certain level. Based on this determination, it is determined whether the running (of the vehicle) using the first motor M1 is performed. When the result of the determination in step S008 is "YES", the operation proceeds to step S009, and when it is "NO", the operation proceeds to step S032.

In step S009, a lock-up clutch fastening upper-limit driving force FLCPLT is retrieved from a map based on the vehicle speed VP and the amount SOC of remaining power of the battery LB. This map search is performed based on a map shown in FIG. 23 in which the horizontal axis indicates the vehicle speed VP (km/h) while the vertical axis indicates the driving force (N), and also in consideration of the amount SOC of remaining power of the battery LB.

Figure 23:
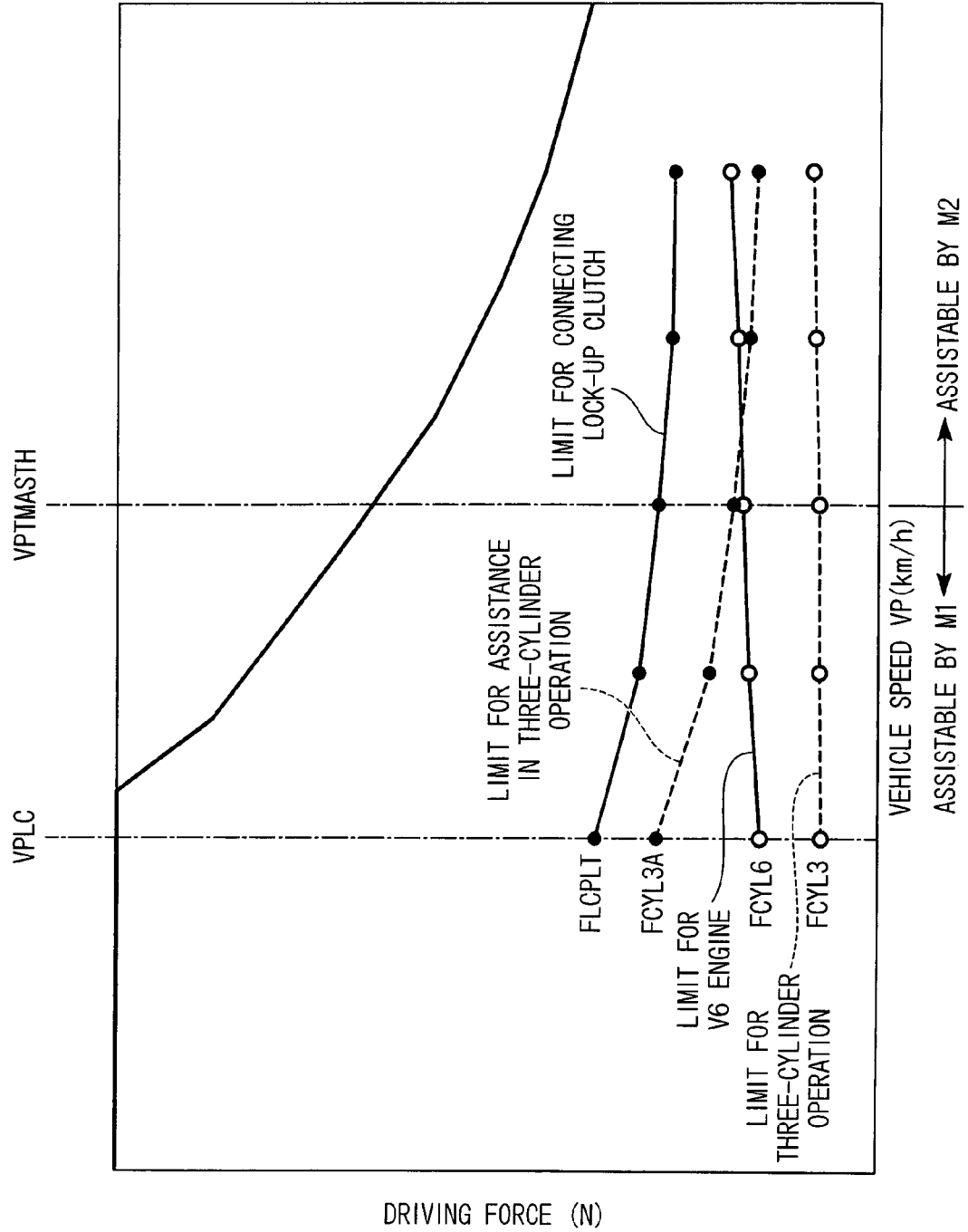
FIG. 23 is a chart showing a relationship between the driving force and the vehicle speed.

As shown in FIG. 23, when the vehicle speed VP is higher than the lock-up clutch fastening lower-limit vehicle speed VPLC, the following four limits are defined with respect to the driving force: (i) the lock-up clutch fastening upper-limit driving force FLCPLT (i.e., the limit for implementing the lock-up connection of the clutch C), (ii) an upper-limit driving force FCYL3A for implementing a cylinder-stop enlarged assistance operation mode (i.e., the limit for the driving force assistance with respect to the three-cylinder operation), (iii) an upper-limit driving force FCYL6 for implementing a V6 operation mode (i.e., the limit for the V6 engine), and (iv) an upper-limit driving force FCYL3 for implementing a cylinder-stop operation mode (i.e., the limit for the three-cylinder operation). With respect to a line (shown in FIG. 23) assigned to each of the above limits, a higher-speed area and a lower-speed area are defined on either side of an upper-limit vehicle speed VPTMASTH for performing the driving force assistance using the first motor M1 during the lock-up mode. In the higher-speed area, the driving force assistance is performed using the second motor M2, and in the lower-speed area, the driving force assistance is performed using the second motor M1.

The second motor M2 rotates at the same rotation speed as that of the engine E; thus, it is used at a higher rotation speed in comparison with the first motor M1. Therefore, when the vehicle speed reaches a level (i.e., the upper-limit vehicle speed VPTMASTH for performing the driving force assistance using the first motor M1 during the lock-up mode), at which the efficiency of the driving force assistance is degraded if using the first motor M1, it is preferable to use the second motor M2 for the driving force assistance at a higher vehicle speed (i.e., than VPTMASTH) at which the second motor M2, having a higher rotation speed, has a higher efficiency, and it provides lower loss.

In the next step S010, it is determined whether the required driving force FREQF (for the forward movement) is less than the lock-up clutch fastening upper-limit driving force FLCPLT. This determination is performed because when FREQF is larger than FLCPLT, a shock occurs and the lock-up connection cannot be performed. When the result of the determination is "YES", the operation proceeds to step S011, and when it is "NO", the operation proceeds to step S032.

In step S011, a lock-up parallel mode is selected, and in the next step S012, a process (see FIG. 22) of selecting a mode in the lock-up parallel mode is performed. This process will be explained later.

In step S032, the permissive upper-limit driving output PREQLMT for the BATT EV mode is retrieved from a map (i.e., a map search is performed) based on the amount SOC of remaining power of the battery LB, and the operation proceeds to step S032A.

In step S032A, an EV continuation determination process (explained later) is performed, and the operation proceeds to step S033.

In step S033, it is determined whether the required drive output power PREQ is higher than the upper-limit driving output PREQLMT for the BATT EV mode. This determination is performed so as to determine whether the running (of the vehicle) using only the battery LB is possible. When the result of the determination in step S033 is "YES", the operation proceeds to step S037, and when it is "NO", the operation proceeds to step S034.

In step S037, it is determined whether the amount SOC of remaining power of the battery LB is less than a lower-limit SOCCHG of remaining power for performing a forced charging operation. When the result of the determination is "YES" (i.e., charging is necessary), the operation proceeds to step S036, and when it is "NO" (i.e., charging is unnecessary), the operation proceeds to step S038.

In step S036, the CHARGE EV mode (see FIG. 7) is selected, and the process of the present flowchart is terminated.

In step S038, the E-PASS EV mode (see FIG. 4) is selected, and the process of the present flowchart is terminated.

In step S034, it is determined whether the engine water temperature TW is higher than the lower-limit engine water temperature TWEV for making the vehicle run in the BATT EV mode. When the result of the determination is "YES", the operation proceeds to step S035, and when it is "NO" (i.e., when the engine E should be driven), the operation proceeds to step S037.

In step S035, it is determined whether the catalyst temperature CAT is higher than the lower-limit catalyst temperature TCATEV for making the vehicle run in the BATT EV mode. When the result of the determination is "YES", the operation proceeds to step S039, and when it is "NO" (i.e., when the engine E should be driven), the operation proceeds to step S037.

In step S039, the BATT EV mode (see FIG. 5) is selected, and the process of the present flowchart is terminated.

Figure 22:
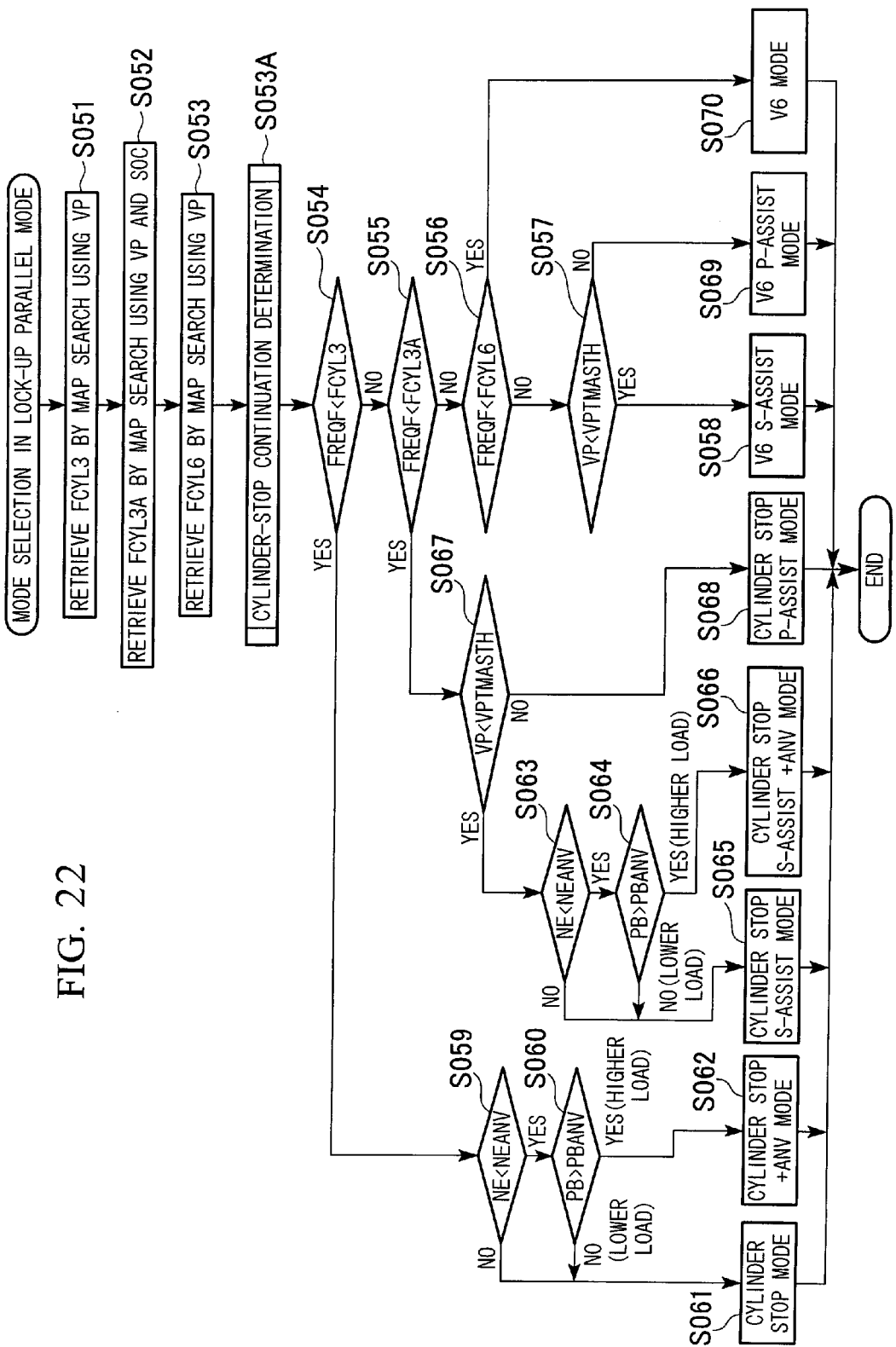
FIG. 22 is a flowchart of a process of selecting a mode in the lock-up parallel mode.

Below, the process of selecting a mode in the lock-up parallel mode will be explained with reference to a flowchart shown in FIG. 22. In the explanation, each mode to be selected belongs to the lock-up mode, which is indicated by the term "lock-up" enclosed in brackets. In FIG. 22, the term "lock-up" is omitted.

In the first step S051, the upper-limit driving force FCYL3 for implementing the cylinder-stop operation mode is retrieved from a map (i.e., a map search is performed) based on the vehicle speed VP.

In the following step S052, the upper-limit driving force FCYL3A for implementing the cylinder-stop enlarged assistance operation mode is retrieved from a map based on the vehicle speed VP and the amount SOC of remaining power of the battery LB.

In the following step S053, the upper-limit driving force FCYL6 for implementing the V6 operation mode is retrieved from a map based on the vehicle speed VP. The operation then proceeds to step S053A.

In step S053A, a cylinder-stop continuation determination process (explained later) is performed, and the operation proceeds to step S054.

Each of the above map-search steps is performed based on the above-described map shown in FIG. 23 in which the horizontal axis indicates the vehicle speed VP (km/h) while the vertical axis indicates the driving force (N), and also in consideration of the amount SOC of remaining power of the battery LB (in case of step S052).

In step S054, it is determined whether the required driving force FREQF (for the forward movement) is less than the upper-limit driving force FCYL3 for implementing the cylinder-stop operation mode. When the result of the determination is "YES", the operation proceeds to step S059, and when it is "NO", the operation proceeds to step S055.

In step S059, it is determined whether the engine speed NE is lower than an upper-limit engine speed NEANV for performing vibration control. When the result of the determination is "YES", the operation proceeds to step S060, and when it is "NO", the operation proceeds to step S061.

In step S061, the cylinder stop (lock-up) mode (see FIG. 12) is selected, and the process of the present flowchart is terminated.

In step S060, it is determined whether the intake-pipe negative pressure PB belongs to a higher-load range (in which the absolute value of the negative pressure is relatively large) in comparison with a lower-limit intake-pipe negative pressure PBANV for performing the vibration control, that is, whether PB is higher than PBANV. When the result of the determination is "YES" (i.e., in the higher-load range), the operation proceeds to step S062, and when it is "NO" (i.e., in a lower-load range), the operation proceeds to step S061.

In step S062, the cylinder stop (lock-up) +ANV mode (see FIG. 14) is selected, and the process of the present flowchart is terminated.

Figure 24:
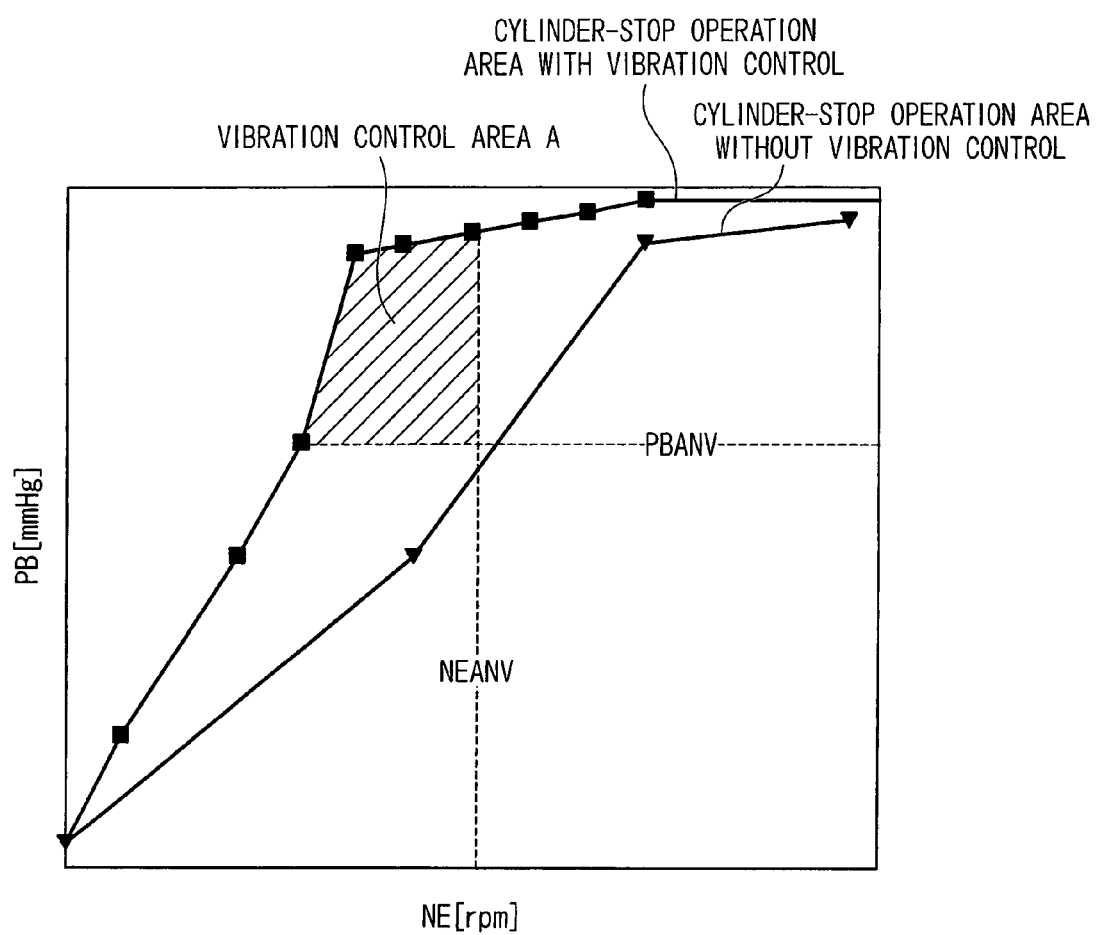
FIG. 24 is a chart showing a relationship between the intake-pipe negative pressure and the engine speed.

FIG. 24 shows a map in which the horizontal axis indicates the engine speed NE (rpm) while the vertical axis indicates the intake-pipe negative pressure PB (mmHg). The upper-limit engine speed NEANV and the lower-limit intake-pipe negative pressure PBANV for performing the vibration control are defined in this map, and the vibration control is performed in a vibration control area A (see the hatched area in FIG. 24) defined by NEANV and PBANV. That is, in order to enlarge the cylinder-stop operation area without vibration control (i.e., when no vibration control is performed), the engine E provides a vibration in an area (i.e., the vibration control area A in FIG. 24) having a low engine speed (i.e., lower than the upper-limit engine speed NEANV) and a high load (i.e., having a higher negative pressure than the lower-limit intake-pipe negative pressure PBANV). Therefore, as shown in FIG. 24, the vibration control is effectively performed in this area so as to provide a cylinder-stop operation area with vibration control, which is wider than the cylinder-stop operation area without vibration control.

In step S055, it is determined whether the required driving force FREQF (for the forward movement) is less than the upper-limit driving force FCYL3A for implementing the cylinder-stop enlarged assistance operation mode. When the result of the determination is "YES", the operation proceeds to step S067, and when it is "NO", the operation proceeds to step S056.

In step S067, it is determined whether the vehicle speed VP is lower than the upper-limit vehicle speed VPTMASTH for performing the driving force assistance using the first motor M1 during the lock-up mode. When the result of the determination is "YES", the operation proceeds to step S063, and when it is "NO", the operation proceeds to step S068.

In step S068, the cylinder stop (lock-up) P-ASSIST mode (see FIG. 13) is selected so as to perform the driving force assistance using the second motor M2 while the cylinder-stop operation is performed. The process of the present flowchart is then terminated.

In step S063, it is determined whether the engine speed NE is lower than the upper-limit engine speed NEANV for performing the vibration control. When the result of the determination is "YES", the operation proceeds to step S064, and when it is "NO", the operation proceeds to step S065.

In step S065, the cylinder stop (lock-up) S-ASSIST mode (see FIG. 16) is selected so as to perform the driving force assistance using the first motor M1 while the cylinder-stop operation is performed. The process of the present flowchart is then terminated.

In step S064, it is determined whether the intake-pipe negative pressure PB belongs to the higher-load range (in which the absolute value of the negative pressure is relatively large) in comparison with the lower-limit intake-pipe negative pressure PBANV for performing the vibration control, that is, whether PB is higher than PBANV. When the result of the determination is "YES" (i.e., in the higher-load range), the operation proceeds to step S066, and when it is "NO" (i.e., in the lower-load range), the operation proceeds to step S065.

In step S066, the cylinder stop (lock-up) S-ASSIST +ANV mode (see FIG. 17) is selected so as to perform (i) the driving force assistance using the first motor M1 and (ii) the vibration control using the second motor M2, while the cylinder-stop operation is performed. The process of the present flowchart is then terminated.

In step S056, it is determined whether the required driving force FREQF (for the forward movement) is less than the upper-limit driving force FCYL6 for implementing the V6 operation mode. When the result of the determination is "YES", the operation proceeds to step S070, and when it is "NO", the operation proceeds to step S057.

In step S070, the V6 (lock-up) mode (see FIG. 10) is selected, and the process of the present flowchart is terminated.

In step S057, it is determined whether the vehicle speed VP is lower than the upper-limit vehicle speed VPTMASTH for performing the driving force assistance using the first motor M1 during the lock-up mode. When the result of the determination is "YES", the operation proceeds to step S058, and when it is "NO", the operation proceeds to step S069.

In step S058, the V6 (lock-up) S-ASSIST mode (see FIG. 15) for performing the driving force assistance using the first motor M1 is selected, and the process of the present flowchart is terminated.

In step S069, the V6 (lock-up) P-ASSIST mode (see FIG. 11) for performing the driving force assistance using the second motor M2 is selected, and the process of the present flowchart is terminated.

Accordingly, the vehicle can run by selecting one of the above-described operation modes. Therefore, (i) the operation mode is switched actively, in particular, in accordance with the required driving force FREQF (for the forward movement), (ii) one (which is more efficient) of the first motor M1 and the second motor M2 can be selected for assisting the driving force of the engine E, and (iii) the second motor M2 can be driven for the vibration control (when necessary) so as to enlarge the cylinder-stop operation area. Therefore, it is possible to considerably improve the fuel consumption.

Figure 20:
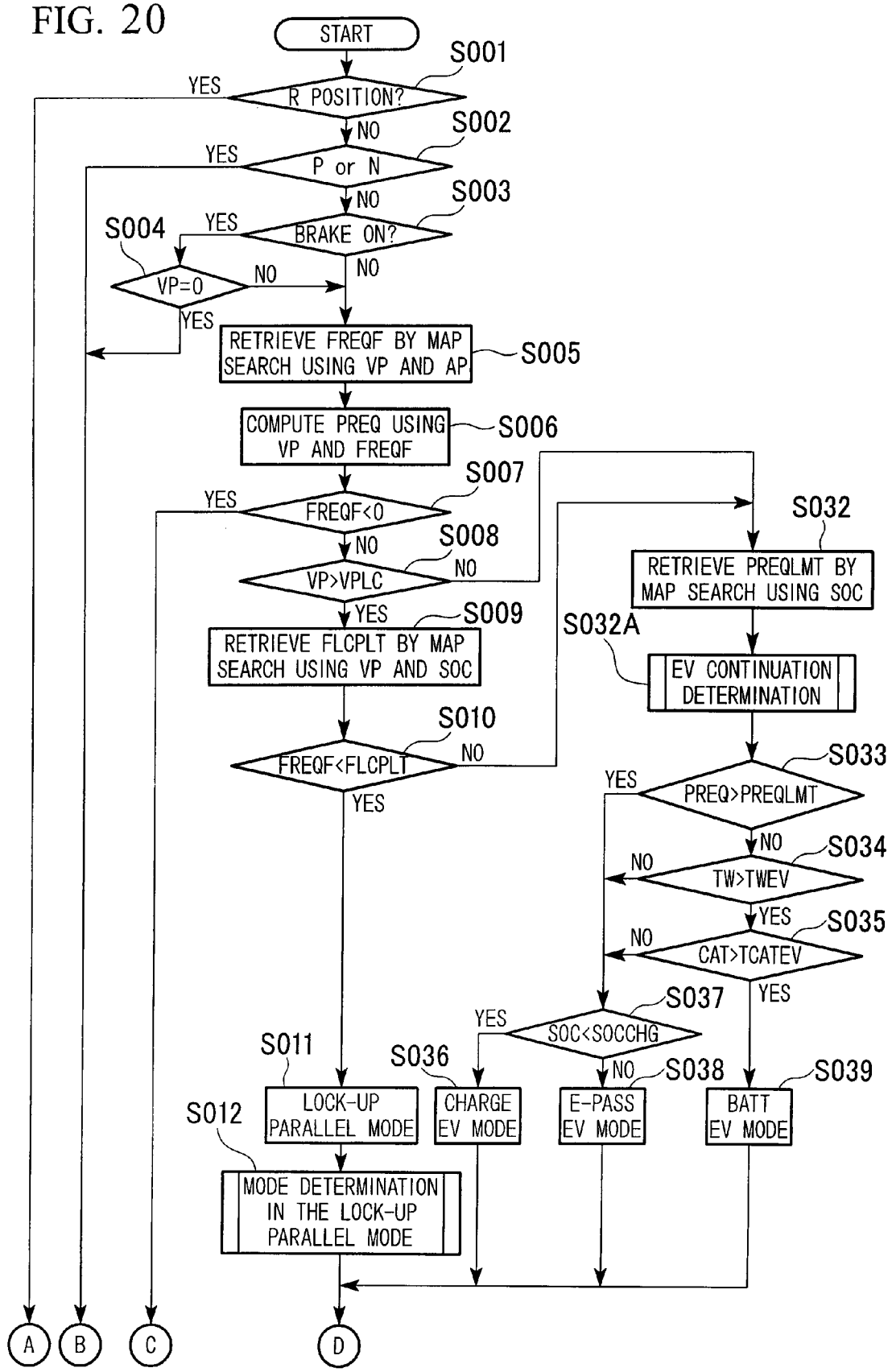
FIG. 20 is a flowchart for determining the operation.
Figure 21:
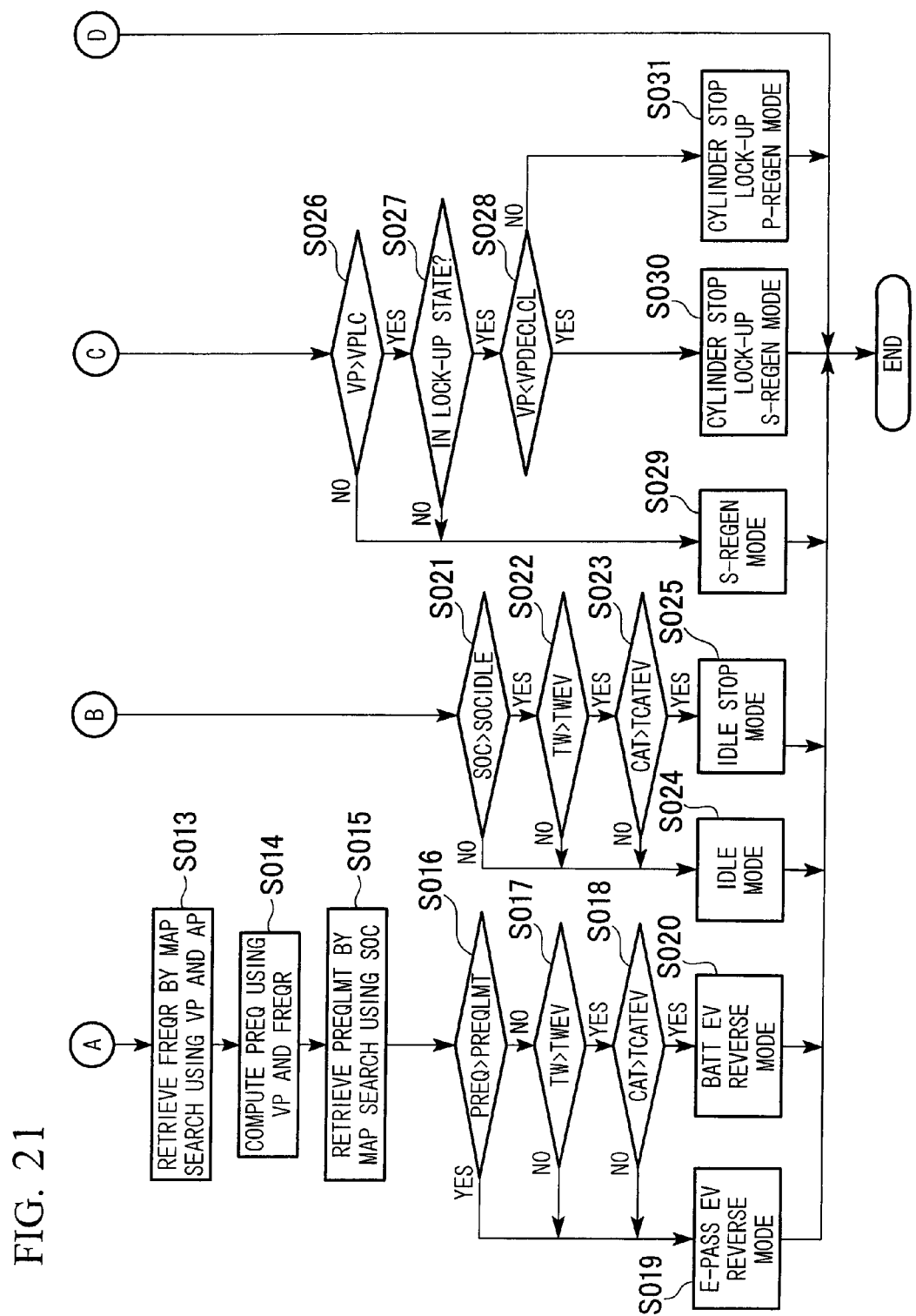
FIG. 21 is also a flowchart for determining the operation.

Before determining the operation mode as shown in FIGS. 20 to 22, a process of reducing or suppressing waste fuel consumption is executed, which is caused by a driver's accelerator-pedal operation. More specifically, such a waste fuel consumption occurs due to a variation in a degree of depression of the accelerator pedal, which is involuntarily performed by the driver, and the variation may cause frequent switching between the cylinder stop operation and the V6 operation. In most cases, the driver involuntarily depresses the accelerator pedal so as to maintain the driving force of the vehicle, the inter-vehicle distance between the present vehicle and a vehicle ahead thereof, or the vehicle speed. Therefore, if such a variation in the degree of depression of the accelerator pedal (i.e., performed by the driver so as to involuntarily control the driving force, the inter-vehicle distance, or the vehicle speed) can be detected and the driving force, the inter-vehicle distance, or the vehicle speed, as a control target, can be maintained to a certain degree, effects by depression of the accelerator pedal, which is involuntarily performed by the driver, can be omitted, and the fuel consumption can be improved.

Figure 25:
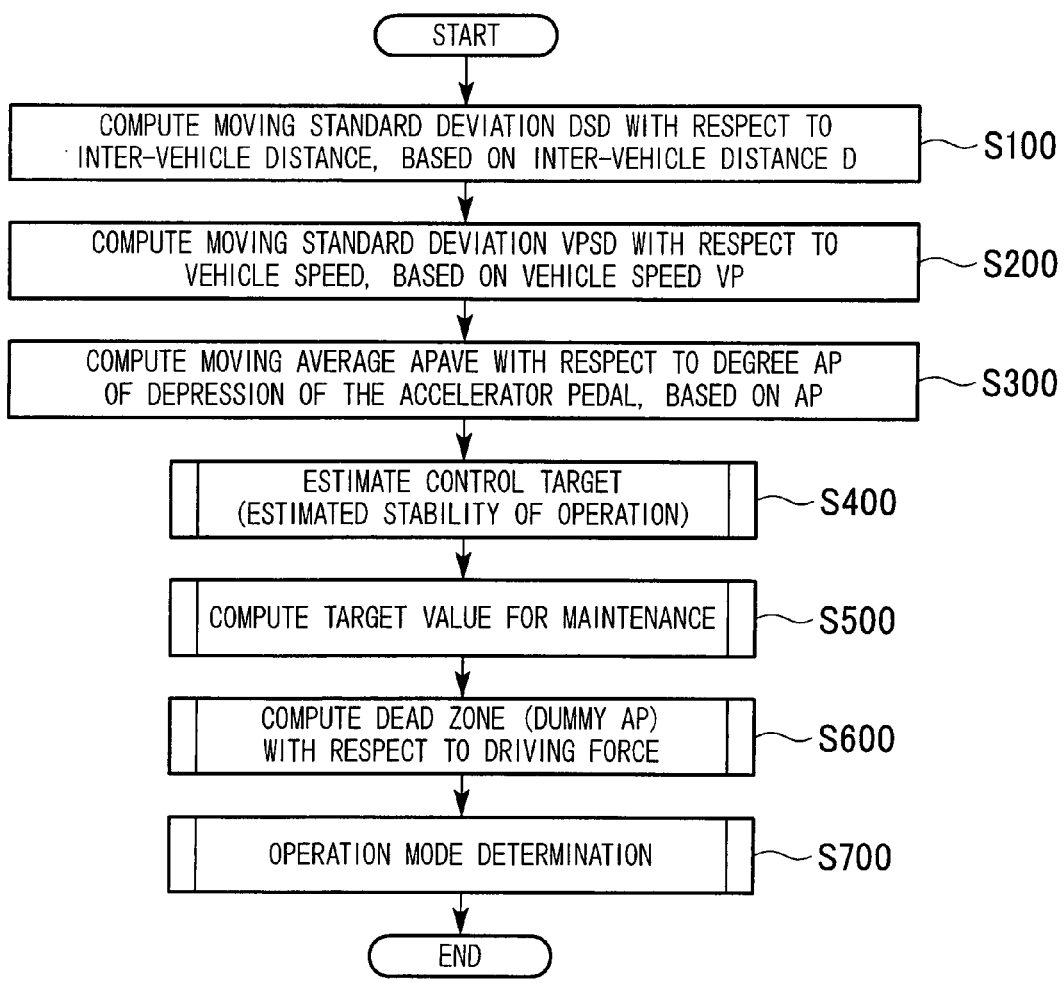
FIG. 25 is a main flowchart showing a general operation of the embodiment.

Below, the general operation including the process performed before the operation mode determination (see FIGS. 20 to 22) will be explained with reference to a main flowchart shown in FIG. 25.

In the first step S100, a moving standard deviation DSD with respect to the inter-vehicle distance is computed based on an inter-vehicle distance D, and the operation proceeds to step S200. The moving standard deviation DSD is computed by the following formula:

$$DSD=\sqrt{((n\Sigma D^2-(\Sigma D)^2)/n(n-1))}$$

where "n" indicates the number of samples for the computation.

In step S200, a moving standard deviation VPSD with respect to the vehicle speed is computed based on the vehicle speed VP, and the operation proceeds to step S300. The moving standard deviation VPSD is computed by the following formula:

$$VPSD=\sqrt{((n\Sigma VP^2-(\Sigma VP)^2)/n(n-1))}$$

where "n" indicates the number of samples for the computation.

The above steps S100 and S200 are performed so as to determine the control target (i.e., the inter-vehicle distance D or the vehicle speed VP). That is, when each moving standard deviation with respect to a relevant variation is computed, the control target (i.e., whether the inter-vehicle distance D or the vehicle speed D should be maintained) can be determined based on a predetermined relationship between the moving standard deviation DSD and the moving standard deviation VPSD. If both should be maintained, priority is given to the control for maintaining the inter-vehicle distance D.

More specifically, when sampling points with respect to running of the vehicle are plotted in a graph in which the vertical axis indicates the moving standard deviation with respect to the inter-vehicle distance and the horizontal axis indicates the moving standard deviation with respect to the vehicle speed, a running pattern for maintaining the vehicle speed and a running pattern for maintaining the inter-vehicle distance are distinguished from each other, while variations in the vehicle speed and the inter-vehicle distance are each present within specific ranges. Specifically, the range for the moving standard deviation DSD is larger than 0, and smaller than or equal to an inter-vehicle distance judgment value DSDJUD, and the range for the moving standard deviation VPSD is larger than 0, and smaller than or equal to a vehicle speed judgment value VPSDJUD. Relevant determination processes are performed in steps S107 and S108 (explained later).

In step S300, a moving average APAVE with respect to the degree AP of depression of the accelerator pedal is computed in accordance with the degree AP of depression of the accelerator pedal. The moving average APAVE is used when the control target is the driving force of the vehicle.

In step S400, the control target is estimated, and stability of operation is also estimated, and the operation proceeds to step S500.

In step S500, a target value for maintenance is computed, and the operation proceeds to step S600.

In step S600, a dead (or neutral) zone ("DUMMY AP") with respect to the driving force is computed, and the operation proceeds to step S700.

In step S700, the operation mode determination, as shown in FIGS. 20 to 22, is performed. Here, (i) in the EV continuation determination in step S032A, the BATT EV mode using the first motor M1 is continued as long as possible, and (ii) in the cylinder-stop continuation determination in step S153A, the cylinder stop operation mode is continued as long as possible, so as to improve the fuel consumption.

Figure 26:
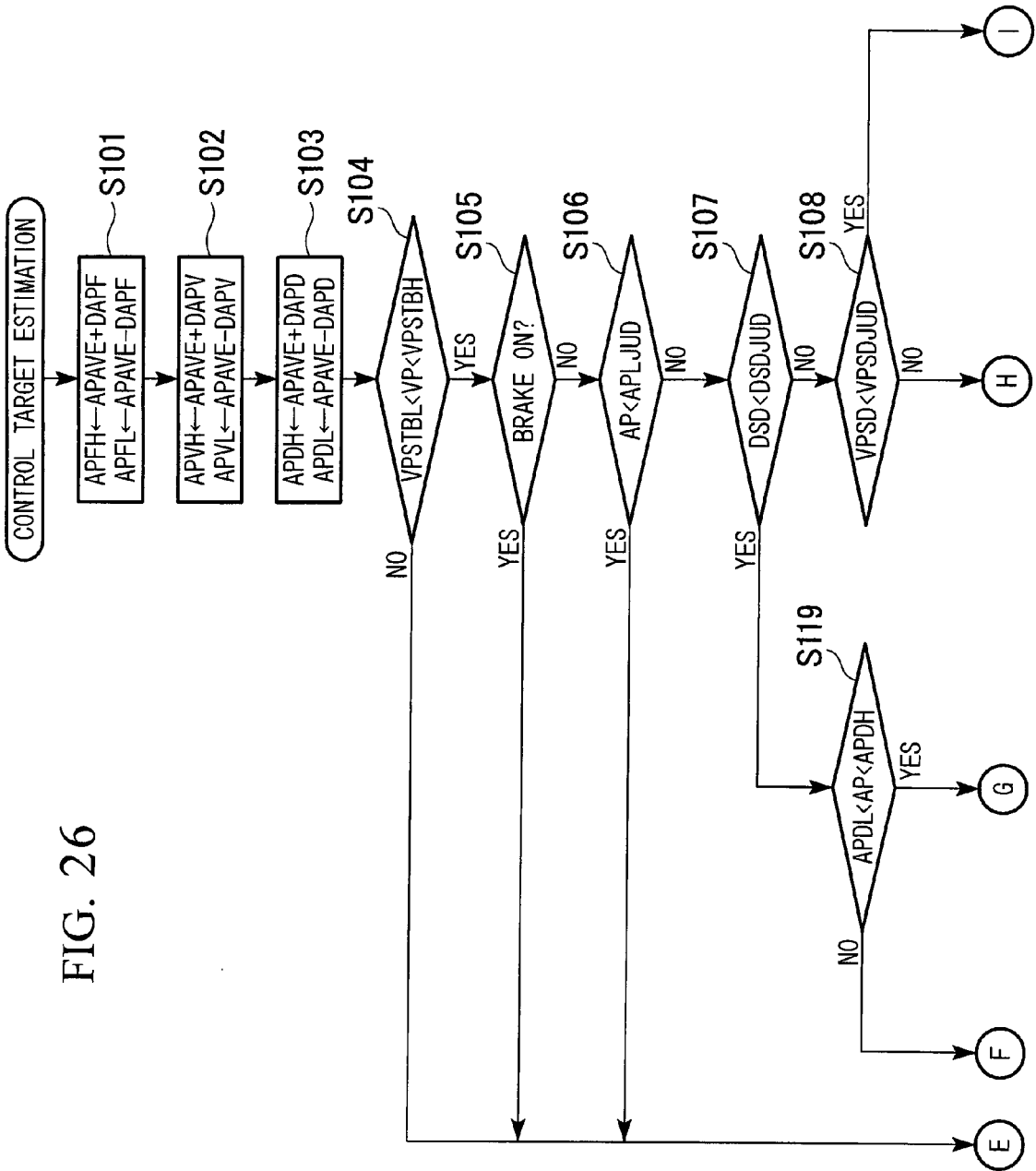
FIG. 26 is a flowchart showing an estimation process of the control target and the operation stability.
Figure 27:
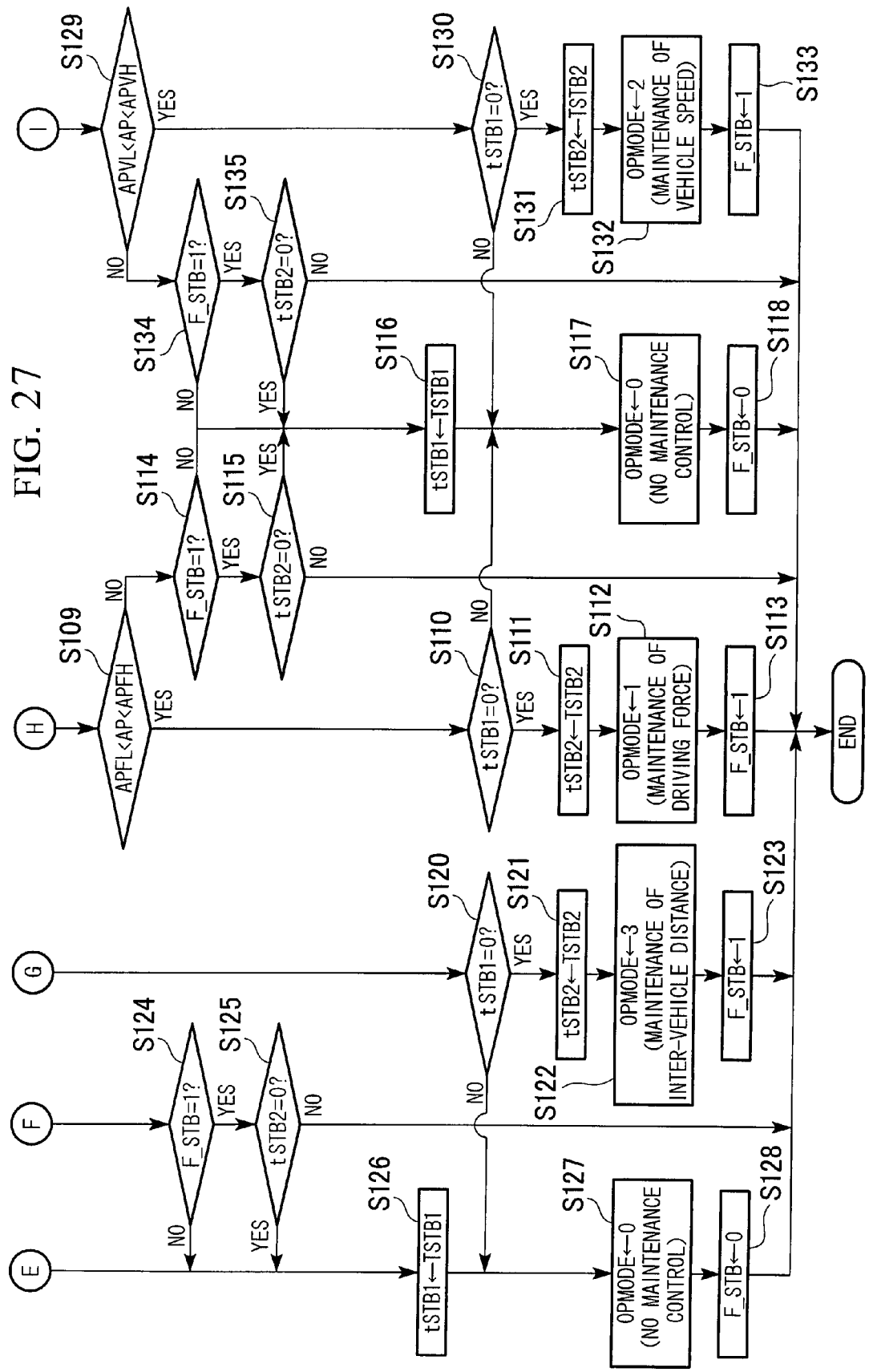
FIG. 27 is also the flowchart showing the estimation process of the control target and the operation stability.

Below, estimation of the control target and the operation stability, performed in step S400 of FIG. 25, will be explained with reference to a flowchart shown in FIGS. 26 and 27. This process is executed so as to estimate (i) whether the driver performs the accelerator pedal depression (or the like) for maintaining the inter-vehicle distance, the vehicle speed, or the driving force, and (ii) whether such an operation of the accelerator pedal or the like, performed for maintaining the inter-vehicle distance, the vehicle speed, or the driving force, is stable.

As results of the estimation, a maintenance control determination code OPMODE is set to 0 (for "no maintenance control"), 1 (for driving-force maintenance), 2 (for vehicle-speed maintenance), or 3 (for inter-vehicle-distance maintenance), and a relevant flag F_STB is also set so as to indicate whether a stable state (STB) has been obtained.

In the first step S101, with respect to the driving force, an upper-limit degree APFH and a lower-limit degree APFL of accelerator-pedal depression are computed by applying ±ΔAP "DAPF" (for judgment with respect to maintenance of a constant driving force) to the moving average APAVE with respect to the degree AP of depression of the accelerator pedal. The operation then proceeds to step S102.

In step S102, with respect to the vehicle speed, an upper-limit degree APVH and a lower-limit degree APVL of the accelerator-pedal depression are computed by applying ±ΔAP "DAPV" (for judgment with respect to maintenance of a constant vehicle speed) to the moving average APAVE. The operation then proceeds to step S103.

In step S103, with respect to the inter-vehicle distance, an upper-limit degree APDH and a lower-limit degree APDL of the accelerator-pedal depression are computed by applying ±ΔAP "DAPD" (for judgment with respect to maintenance of a constant inter-vehicle distance) to the moving average APAVE. The operation then proceeds to step S104.

Figure 32:
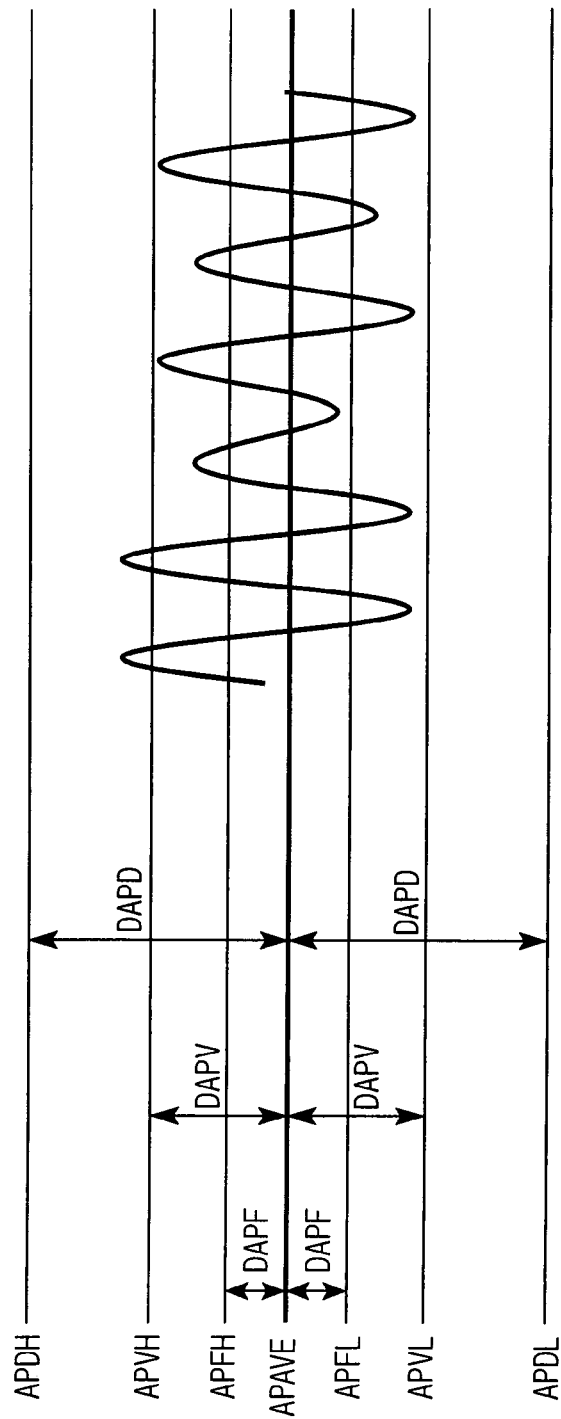
FIG. 32 is a diagram showing upper-limit ranges of the degree of depression of the accelerator pedal, for determining maintenance of the driving force, the vehicle speed, and the inter-vehicle distance.

In FIG. 32, the center line indicates the moving average APAVE with respect to the degree AP of depression of the accelerator pedal. As shown in FIG. 32, it may be determined that (i) the driver's operation is performed between ±DAPF with respect to the moving average APAVE so as to maintain the driving force, (ii) the driver's operation is performed between ±DAPV (having a larger width in comparison with ±DAPF) with respect to the moving average APAVE so as to maintain the vehicle speed, or (iii) the driver's operation is performed between ±DAPD (having a larger width in comparison with ±DAPV) with respect to the moving average APAVE so as to maintain the inter-vehicle distance. Among the above three results of the determination, priority is given to one having a narrower range with respect to ΔAP, so as to improve the fuel consumption. In consideration of the braking distance, the inter-vehicle distance has a larger ΔAP in comparison with the vehicle speed. In addition, appropriate values of DAPV and DAPD vary depending on each running operation or each driver. Therefore, a learning process is performed based on the amount of variation in the degree of depression of the accelerator pedal while the moving standard deviation with respect to the vehicle speed or the inter-vehicle distance is within a specific range.

In step S104, it is determined whether the vehicle speed VP is higher than a lower-limit vehicle speed VPSTBL and lower than an upper-limit vehicle speed VPSTBH, both values being defined for estimating and determining stability. When the result of the determination is "YES", the operation proceeds to step S105, and when it is "NO", the operation proceeds to step S126. If the vehicle speed is too high or low, it is not preferable to perform maintenance control for continuing the present state (with respect to the driving force, the vehicle speed, or the inter-vehicle distance) regardless of the variation in the degree AP of depression of the accelerator pedal.

In step S126, the value of a maintenance control execution delay timer tSTB1 is set to TSTB1, and the operation proceeds to step S127.

In step S127, the maintenance control determination code OPMODE is set to 0 (which means no maintenance control).

In the following step S128, the value of the stability determination flag F_STB is set to 0, and the process of the present flowchart is terminated. Accordingly, the maintenance control is not executed.

In step S105, it is determined whether the brake switch (BRAKE) is on. When the result of the determination is "YES", the operation proceeds to step S126, and when it is "NO", the operation proceeds to step S106. When the brake pedal is depressed, the maintenance control should not be executed.

In step S106, it is determined whether the degree AP of depression of the accelerator pedal is smaller than a lower-limit degree APLJUD for estimating and determining the stability. When the result of the determination is "YES", the operation proceeds to step S126, and when it is "NO", the operation proceeds to step S107. If the degree AP of depression of the accelerator pedal is too small, the maintenance control should not be executed.

In step S107, it is determined whether the moving standard deviation DSD with respect to the inter-vehicle distance is smaller than the judgment value DSDJUD for the inter-vehicle distance. When the result of the determination is "YES", the operation proceeds to step S119, and when it is "NO", the operation proceeds to step S108.

In step S119, it is determined whether the degree AP of depression of the accelerator pedal is larger than the lower-limit degree APDL and smaller than the upper-limit degree APDH, both degrees being defined for judgment with respect to maintenance of a constant inter-vehicle distance. When the result of the determination is "YES", the operation proceeds to step S120, and when it is "NO", the operation proceeds to step S124.

In step S124, it is determined whether the stability determination flag F_STB has a value of 1. When the result of the determination is "YES", the operation proceeds to step S125, and when it is "NO", the operation proceeds to step S126.

In step S125, it is determined whether the value of a maintenance control release delay timer tSTB2 is 0. When the result of the determination is "YES", the operation proceeds to step S126, and when it is "NO", the process of the present flowchart is terminated.

That is, in the state in which the stability determination flag F_STB has a value of 1, the maintenance control is not released until the maintenance control release delay timer tSTB2 has a value of 0, so that a hunting phenomenon with respect to the control can be prevented (similar effects can be obtained through steps S115 and S135).

In step S120, it is determined whether the value of the maintenance control execution delay timer tSTB1 is 0. When the result of the determination is "YES", the operation proceeds to step S121, and when it is "NO", the operation proceeds to step S127.

In step S121, the value of the maintenance control release delay timer tSTB2 is set to TSTB2, and the operation proceeds to step S122.

In step S122, the maintenance control determination code OPMODE is set to 3 (which indicates maintenance of the inter-vehicle distance), and in the next step S123, the value of the stability determination flag F_STB is set to 1. The process of the present flowchart is then terminated. Accordingly, control for maintaining the inter-vehicle distance is executed.

That is, the maintenance control is not executed until the maintenance control execution delay timer tSTB1 has a value of 0, so that a hunting phenomenon with respect to the control can be prevented (similar effects can be obtained through steps S110 and S130).

In step S108, it is determined whether the moving standard deviation VPSD with respect to the vehicle speed is smaller than the judgment value VPSDJUD for the vehicle speed. When the result of the determination is "YES", the operation proceeds to step S129, and when it is "NO", the operation proceeds to step S109.

In step S109, it is determined whether the degree AP of depression of the accelerator pedal is larger than the lower-limit degree APFL and smaller than the upper-limit degree APFH, both degrees being defined for judgment with respect to maintenance of a constant driving force. When the result of the determination is "YES", the operation proceeds to step S110, and when it is "NO", the operation proceeds to step S114.

In step S114, it is determined whether the stability determination flag F_STB has a value of 1. When the result of the determination is "YES", the operation proceeds to step S115, and when it is "NO", the operation proceeds to step S116.

In step S116, the value of the maintenance control execution delay timer tSTB1 is set to TSTB1, and the operation proceeds to step S117.

In step S117, the maintenance control determination code OPMODE is set to 0 (for no maintenance control), and in the next step S118, the value of the stability determination flag F_STB is set to 0. The process of the present flowchart is then terminated, and accordingly, the maintenance control is not executed.

In step S115, it is determined whether the value of the maintenance control release delay timer tSTB2 is 0. When the result of the determination is "YES", the operation proceeds to step S116, and when it is "NO", the process of the present flowchart is terminated.

In step S110, it is determined whether the value of the maintenance control execution delay timer tSTB1 is 0. When the result of the determination is "YES", the operation proceeds to step S111, and when it is "NO", the operation proceeds to step S117.

In step S111, the value of the maintenance control release delay timer tSTB2 is set to TSTB2, and the operation proceeds to step S112.

In step S112, the maintenance control determination code OPMODE is set to 1 (which means maintenance of the driving force), and in the next step S113, the value of the stability determination flag F_STB is set to 1. The process of the present flowchart is then terminated, and the driving-force maintenance control is executed.

In step S129, it is determined whether the degree AP of depression of the accelerator pedal is larger than the lower-limit degree APVL and smaller than the upper-limit degree APVH, both degrees being defined for judgment with respect to maintenance of a constant vehicle speed. When the result of the determination is "YES", the operation proceeds to step S130, and when it is "NO", the operation proceeds to step S134.

In step S134, it is determined whether the stability determination flag F_STB has a value of 1. When the result of the determination is "YES", the operation proceeds to step S135, and when it is "NO", the operation proceeds to step S116.

In step S135, it is determined whether the value of the maintenance control release delay timer tSTB2 is 0. When the result of the determination is "YES", the operation proceeds to step S116, and when it is "NO", the process of the present flowchart is terminated.

In step S130, it is determined whether the value of the maintenance control execution delay timer tSTB1 is 0. When the result of the determination is "YES", the operation proceeds to step S131, and when it is "NO", the operation proceeds to step S117.

In step S131, the value of the maintenance control release delay timer tSTB2 is set to TSTB2, and the operation proceeds to step S132.

In step S132, the maintenance control determination code OPMODE is set to 2 (which means maintenance of the vehicle speed), and in the next step S133, the value of the stability determination flag F_STB is set to 1. The process of the present flowchart is then terminated, and the vehicle-speed maintenance control is executed.

Figure 28:
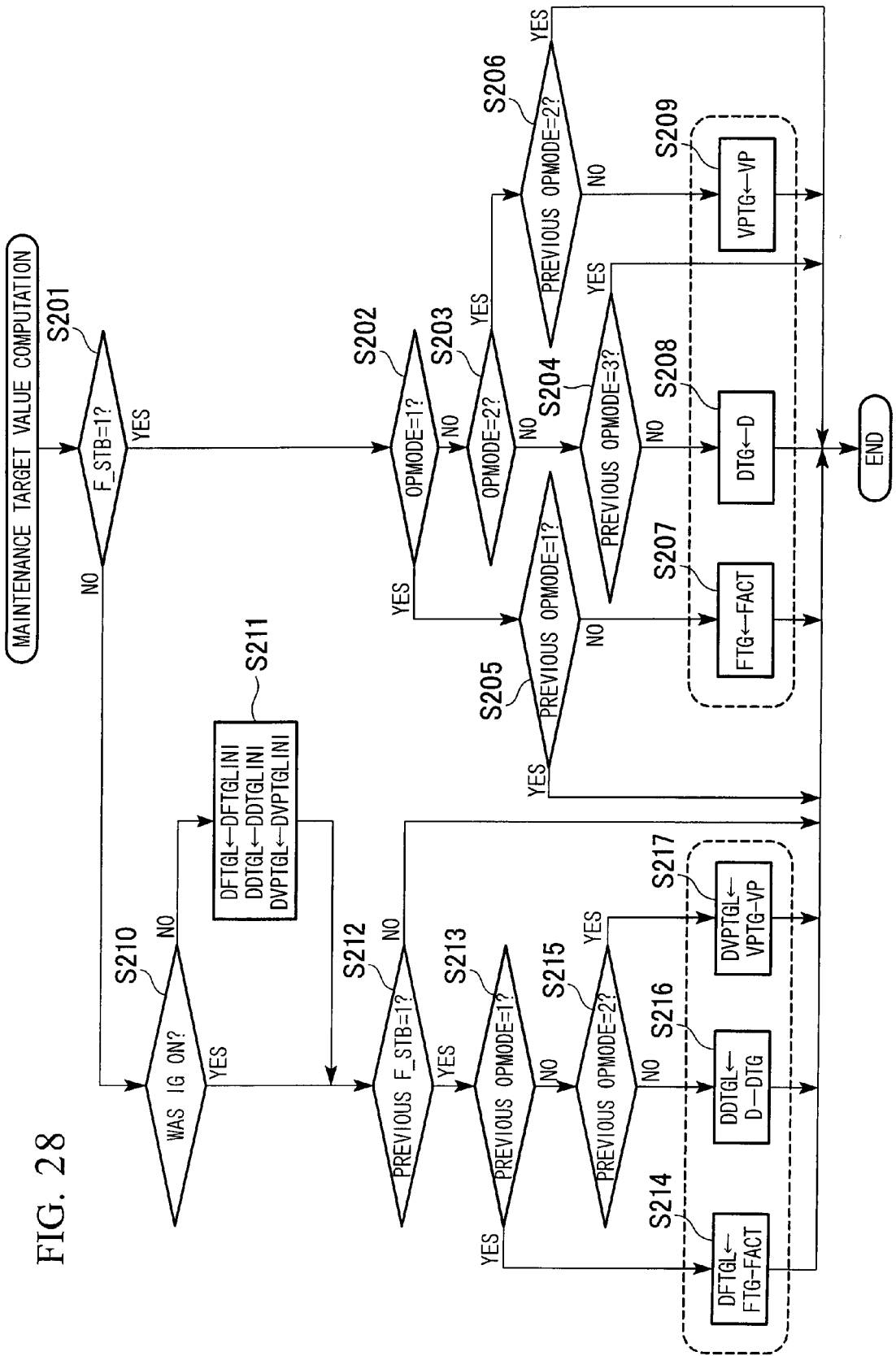
FIG. 28 is a flowchart showing a computation process of the target value for maintenance.

Below, computation of the target value for maintenance, performed in step S500 in FIG. 25, will be explained with reference to a flowchart shown in FIG. 28. In this computation process, (i) a target value (FTG, VPTG, or DTG) with respect to the maintenance control, for the driving force, the vehicle speed, or the inter-vehicle distance is determined (in steps S207, S208, and S209), and (ii) a maintenance-control limit data value (DFTGL, DVPTGL, or DDTGL) corresponding to the above target value is computed (in steps S214, S216, and S217) as a standard for determining whether the driver feels unsatisfactory and performs an operation for terminating the present mode. That is, the limit data values DFTGL, DVPTGL, and DDTGL respectively indicate the degree of decrease in the driving force in the driving-force maintenance mode, the degree of decrease in the vehicle speed in the vehicle-speed maintenance mode, and the degree of increase in the inter-vehicle distance in the inter-vehicle-distance maintenance mode. The limit data values DFTGL, DVPTGL, and DDTGL are each learned every time the relevant mode is terminated for each running operation and each driver; thus, values suitable for the present driving state and the present driver are determined.

In the first step S201, it is determined whether the stability determination flag F_STB has a value of 1. When the result of the determination is "YES", the operation proceeds to step S202, and when it is "NO", the operation proceeds to step S210.

In step S202, it is determined whether the maintenance control determination code OPMODE is 1. When the result of the determination is "YES", the operation proceeds to step S205, and when it is "NO", the operation proceeds to step S203.

In step S203, it is determined whether the maintenance control determination code OPMODE is 2. When the result of the determination is "YES", the operation proceeds to step S206, and when it is "NO", the operation proceeds to step S204.

In step S205, it is determined whether the previous value of the maintenance control determination code OPMODE is also 1. When the result of the determination is "YES", the process of the present flowchart is terminated. This is because, when the same mode is selected in the previous execution, the present mode is continued (similar operations are performed through steps S204 and S206). When the result of the determination in step S205 is "NO", the operation proceeds to step S207, in which a target driving force FTG for maintaining a constant driving force is set to a present driving force FACT.

In step S204, it is determined whether the previous value of the maintenance control determination code OPMODE is 3. When the result of the determination is "YES", the process of the present flowchart is terminated, and when it is "NO", the operation proceeds to step S208. In step S208, a target inter-vehicle distance DTG for maintaining a constant inter-vehicle distance is set to the present inter-vehicle distance D. The process of the present flowchart is then terminated.

In step S206, it is determined whether the previous value of the maintenance control determination code OPMODE is 2. When the result of the determination is "YES", the process of the present flowchart is terminated, and when it is "NO", the operation proceeds to step S209. In step S209, a target vehicle speed VPG for maintaining a constant vehicle speed is set to the present vehicle speed VP. The process of the present flowchart is then terminated.

As described above, when the target value FTG, VPTG, or DTG is set to the relevant present value, that is, the present driving force FACT, vehicle speed VP, or inter-vehicle distance D, control in conformity with the driver's intention can be performed without an influence of the driver's depression of the accelerator pedal.

In step S210, it is determined whether the ignition switch (IG) was on in a previous determination with respect to the state thereof. This step is performed for determining whether the engine is initially started. When the result of the determination in step S210 is "YES", the operation proceeds to step S212, and when it is "NO", the operation proceeds to step S211, because this is the initial starting of the vehicle.

In step S211, the above-described maintenance-control limit data values are set to initial values. More specifically, (i) a permissive delta driving force DFTGL, defined for determining whether the control for maintaining a constant driving force should be continued, is set to an initial value DFTGLINI, (ii) a permissive delta inter-vehicle distance DDTGL, defined for determining whether the control for maintaining a constant inter-vehicle distance should be continued, is set to an initial value DDTGLINI, and (iii) a permissive delta vehicle speed DVPTGL, defined for determining whether the control for maintaining a constant vehicle speed should be continued, is set to an initial value DVPTGLINI. The operation then proceeds to step S212.

This initialization is performed because this is the initial starting of the vehicle, and thus the permissive delta driving force DFTGL, the permissive delta inter-vehicle distance DDTGL, and the permissive delta vehicle speed DVPTGL, which respectively have values learned by the driver of the previous running, should be reset.

In step S212, it is determined whether the previous value of the stability determination flag F_STB is 1. When the result of the determination is "YES", the operation proceeds to step S213, and when it is "NO", the process of the present flowchart is terminated.

In step S213, it is determined whether the previous value of the maintenance control determination code OPMODE is 1. When the result of the determination is "YES", the operation proceeds to step S214, and when it is "NO", the operation proceeds to step S215.

In step S214, the permissive delta driving force DFTGL (for determining whether the control for maintaining a constant driving force should be continued) is set to a value obtained by subtracting the present driving force FACT from the target driving force FTG. The process of the present flowchart is then terminated.

In step S215, it is determined whether the previous value of the maintenance control determination code OPMODE is 2. When the result of the determination is "YES", the operation proceeds to step S217, and when it is "NO", the operation proceeds to step S216.

In step S216, the permissive delta inter-vehicle distance DDTGL (for determining whether the control for maintaining a constant inter-vehicle distance should be continued) is set to a value obtained by subtracting the target inter-vehicle distance DTG from the present inter-vehicle distance D. The process of the present flowchart is then terminated.

In step S217, the permissive delta vehicle speed DVPTGL (for determining whether the control for maintaining a constant vehicle speed should be continued) is set to a value obtained by subtracting the present vehicle speed VP from the target vehicle speed VPTG. The process of the present flowchart is then terminated.

As described above, when each maintenance mode for the driving force, the vehicle speed, or the inter-vehicle distance is terminated (i.e., in the case of "NO" in step S201), the amount (DFTGL) of decrease in the driving force, the amount (DVPTGL) of decrease in the vehicle speed, or the amount (DDTGL) of increase in the inter-vehicle distance is obtained, so as to continue the control for maintaining a relevant constant value until the driving force, the vehicle speed, or the inter-vehicle distance has changed by the relevant obtained amount. Accordingly, it is possible to enlarge a driving range for improving the fuel consumption without an influence of the variation in the driver's depression of the accelerator pedal.

Figure 29:
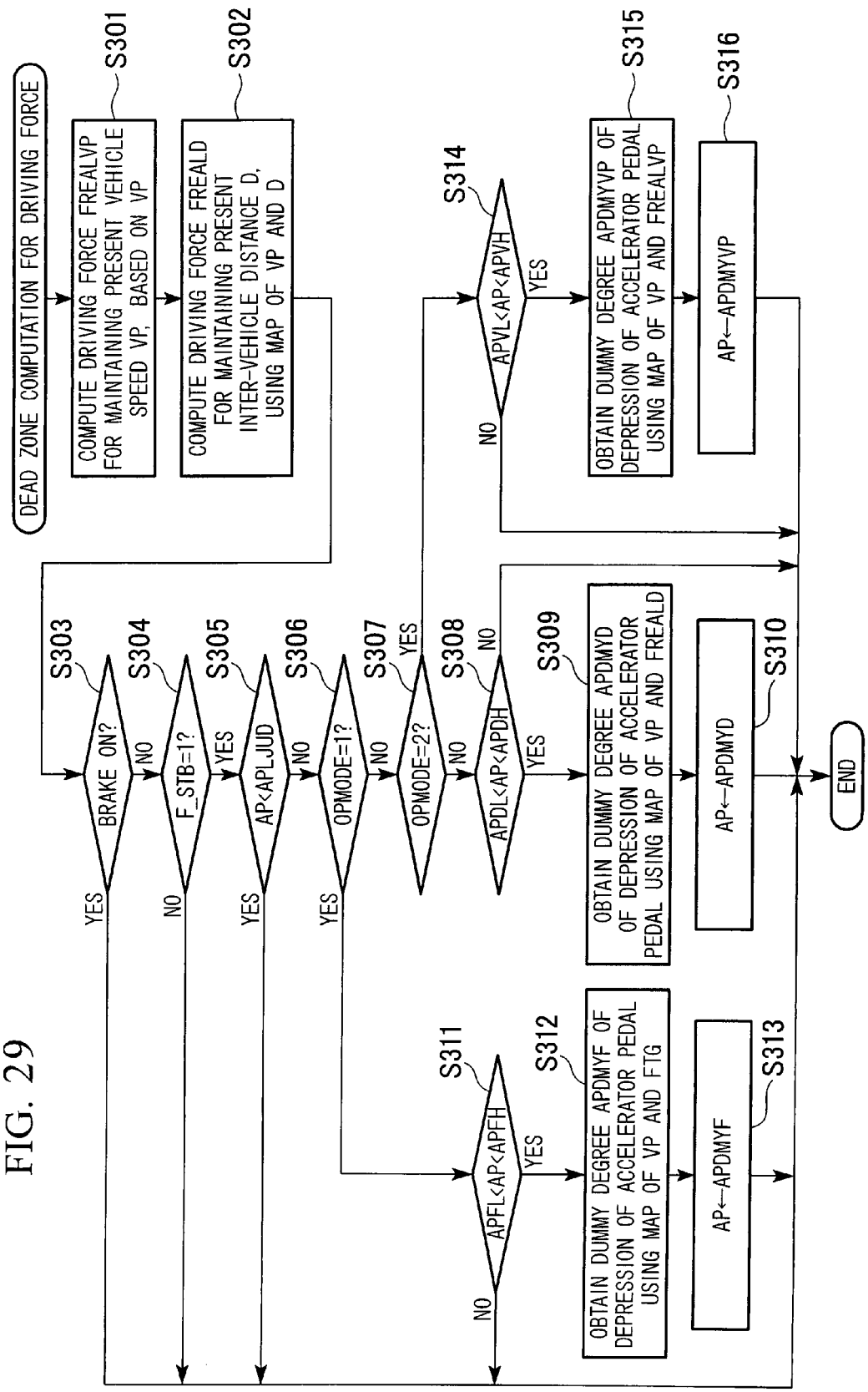
FIG. 29 is a flowchart showing a computation process of the dead zone with respect to the driving force.

Below, computation of the dead (or neutral) zone with respect to the driving force (performed in step S600 in FIG. 25) will be explained with reference to a flowchart shown in FIG. 29.

Figure 33:
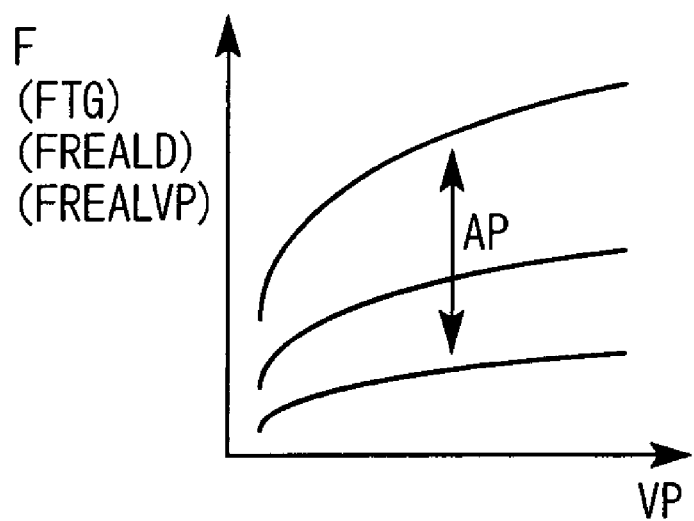
FIG. 33 is a graph for obtaining the degree AP of depression of the accelerator pedal, based on the target driving force FTG for maintaining a constant driving force, the driving force FREALD necessary for maintaining the present inter-vehicle distance, the driving force FREALVP necessary for maintaining the present vehicle speed, and the vehicle speed VP.

This process is performed for setting the degree of depression of the accelerator pedal in the dead zone. Originally, the driving force is determined in accordance with the degree of depression of the accelerator pedal. However, in order to prevent the fuel consumption from increasing due to the driver's involuntary depression of the accelerator pedal, a zone in which the driving force is not set in accordance with the degree of depression of the accelerator pedal (i.e., a dead zone) is defined within the range of the variation in the depression of the accelerator pedal (see FIG. 32). The degree of depression of the accelerator pedal, used for outputting the driving force corresponding to the driving force, vehicle speed, or inter-vehicle distance maintenance mode, is obtained using a map as shown in FIG. 33.

In step S301, a driving force FREALVP, necessary for maintaining the present vehicle speed, is computed based on the vehicle speed VP, and the operation proceeds to step S302.

In step S302, a driving force FREALD, necessary for maintaining the present inter-vehicle distance, is computed using a map with respect to the vehicle speed VP and the inter-vehicle distance D, and the operation proceeds to step S303.

In step S303, it is determined whether the brake switch (BRAKE) is on. When the result of the determination is "YES", the process of the present flowchart is terminated, and when it is "NO", the operation proceeds to step S304. When the brake pedal is depressed, the maintenance control should not be executed.

In step S304, it is determined whether the stability determination flag F_STB has a value of 1. When the result of the determination is "YES", the operation proceeds to step S305, and when it is "NO", the process of the present flowchart is terminated. When the maintenance control has been terminated, it is unnecessary to compute the dead zone.

In step S305, it is determined whether the degree AP of depression of the accelerator pedal is smaller than the lower-limit degree APLJUD for estimating and determining the stability. When the result of the determination is "YES", the process of the present flowchart is terminated, and when it is "NO", the operation proceeds to step S306. If the degree AP of depression of the accelerator pedal is too small, the maintenance control should not be executed.

In step S306, it is determined whether the maintenance control determination code OPMODE is 1. When the result of the determination is "YES", the operation proceeds to step S311, and when it is "NO", the operation proceeds to step S307.

In step S311, it is determined whether the degree AP of depression of the accelerator pedal is larger than the lower-limit degree APFL and smaller than the upper-limit degree APFH, both degrees being defined for judgment with respect to maintenance of a constant driving force. When the result of the determination is "YES", the operation proceeds to step S312, and when it is "NO", the process of the present flowchart is terminated.

In step S312, a dummy (or substitutive) degree APDMYF of depression of the accelerator pedal, used in the control for maintaining a constant driving force, is determined based on the vehicle speed VP and the target driving force FTG, which are defined in a map as shown in FIG. 33. In the next step S313, the degree AP of depression of the accelerator pedal is set to the dummy (or substitutive) degree APDMYF, and the process of the present flowchart is terminated. With respect to FIG. 33 in which the vertical axis indicates the driving force, and the horizontal axis indicates the vehicle speed, the degree AP of depression of the accelerator pedal at the point of intersection between the target driving force FTG and the vehicle speed VP is obtained in step S312.

In step S307, it is determined whether the maintenance control determination code OPMODE is 2. When the result of the determination is "YES", the operation proceeds to step S314, and when it is "NO", the operation proceeds to step S308.

In step S308, it is determined whether the degree AP of depression of the accelerator pedal is larger than the lower-limit degree APDL and smaller than the upper-limit degree APDH, both degrees being defined for judgment with respect to maintenance of a constant inter-vehicle distance. When the result of the determination is "YES", the operation proceeds to step S309, and when it is "NO", the process of the present flowchart is terminated.

In step S309, a dummy (or substitutive) degree APDMYD of depression of the accelerator pedal, used in the control for maintaining a constant inter-vehicle distance, is determined based on the vehicle speed VP and a driving force FREALD, which is necessary for maintaining the present inter-vehicle distance, where VP and FREALD are defined in a map as shown in FIG. 33. In the next step S310, the degree AP of depression of the accelerator pedal is set to the dummy (or substitutive) degree APDMYD, and the process of the present flowchart is terminated. With respect to FIG. 33, the degree AP of depression of the accelerator pedal at the point of intersection between the driving force FREALD and the vehicle speed VP is obtained in step S309.

In step S314, it is determined whether the degree AP of depression of the accelerator pedal is larger than the lower-limit degree APVL and smaller than the upper-limit degree APVH, both degrees being defined for judgment with respect to maintenance of a constant vehicle speed. When the result of the determination is "YES", the operation proceeds to step S315, and when it is "NO", the process of the present flowchart is terminated.

In step S315, a dummy (or substitutive) degree APDMYVP of depression of the accelerator pedal, used in the control for maintaining a constant vehicle speed, is determined based on the vehicle speed VP and a driving force FREALVP, which is necessary for maintaining the present vehicle speed, where VP and FREALVP are defined in a map as shown in FIG. 33. In the next step S316, the degree AP of depression of the accelerator pedal is set to the dummy (or substitutive) degree APDMYVP, and the process of the present flowchart is terminated. With respect to FIG. 33, the degree AP of depression of the accelerator pedal at the point of intersection between the driving force FREALVP and the vehicle speed VP is obtained in step S315.

Figure 30:
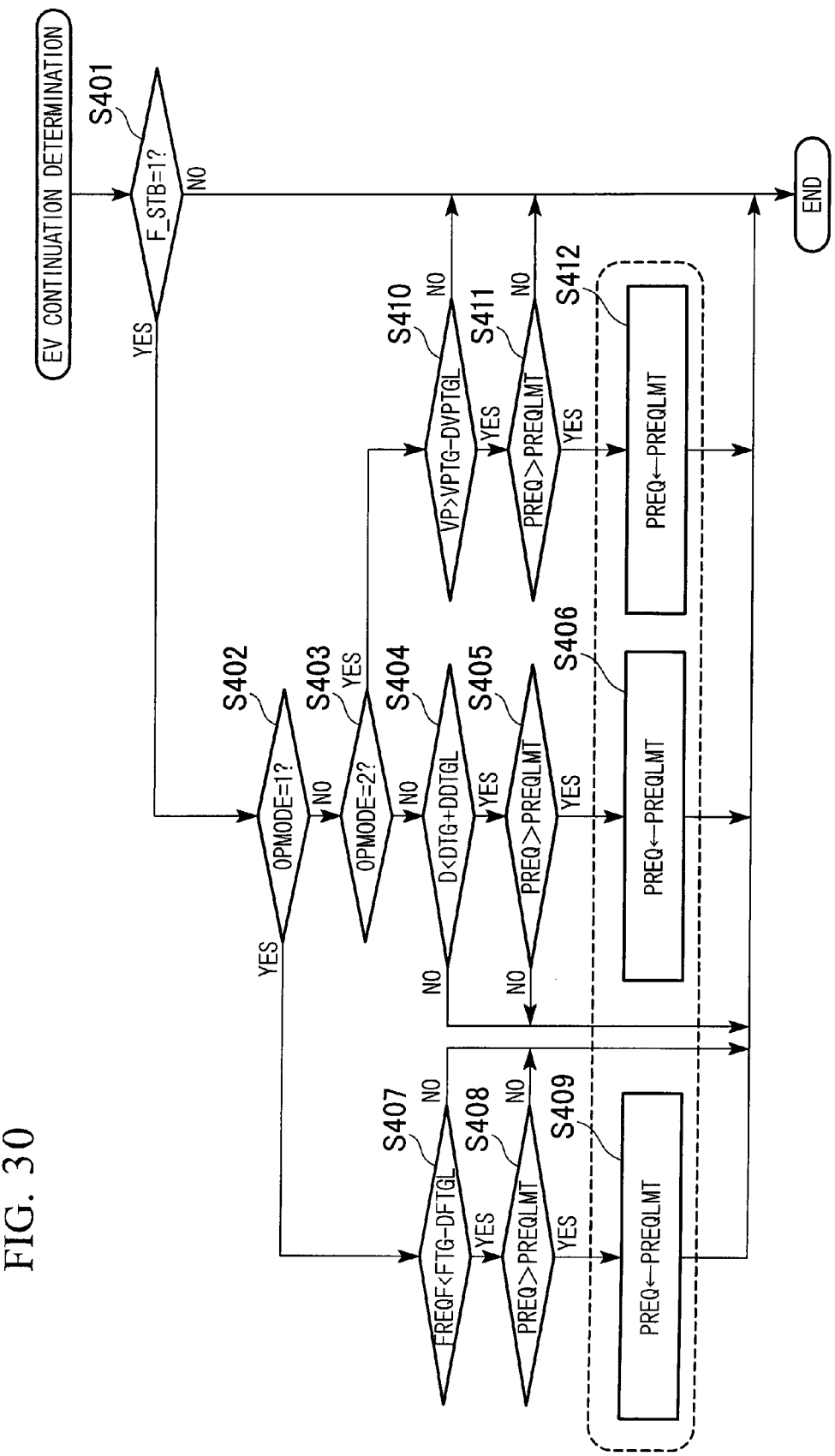
FIG. 30 is a flowchart showing a process of the EV continuation determination.

Below, the EV continuation determination, performed in step S032A in FIG. 20, will be explained with reference to a flowchart shown in FIG. 30. Originally, when the required drive output power is large, the vehicle may not run in the BATT EV mode. However, even in such a case, if some conditions are satisfied (see steps S407, S408, S404, S405, S410, and S411), a required drive output power for running in the BATT EV mode (i.e., the permissive upper-limit drive output power PREQLMT for the driving operation in the BATT EV mode) can be set so as to enlarge the EV mode area, and to improve the fuel consumption. More specifically, the EV continuation determination includes (i) judgment with respect to the above conditions, and (ii) setting the required drive output power to PREQLMT after the conditions are satisfied, so as to continue the relevant EV mode (refer to a part surrounded by a dashed line in FIG. 30).

In step S401, it is determined whether the stability determination flag F_STB has a value of 1. When the result of the determination is "YES", the operation proceeds to step S402, and when it is "NO", the process of the present flowchart is terminated.

In step S402, it is determined whether the maintenance control determination code OPMODE is 1. When the result of the determination is "YES", the operation proceeds to step S407, and when it is "NO", the operation proceeds to step S403.

In step S403, it is determined whether the maintenance control determination code OPMODE is 2. When the result of the determination is "YES", the operation proceeds to step S410, and when it is "NO", the operation proceeds to step S404.

In step S407, it is determined whether the required driving force FREQF (for the forward movement) is smaller than a value obtained by subtracting the permissive delta driving force DFTGL (for determining whether the control for maintaining a constant driving force should be continued) from the target driving force FTG. When the result of the determination is "YES", the operation proceeds to step S408, and when it is "NO", the process of the present flowchart is terminated.

The value of the permissive delta driving force DFTGL varies depending on each running operation, or each driver; thus, the above value obtained by subtracting DFTGL from FTG is compared with the required driving force FREQF (for the forward movement), and the BATT EV mode is continued when FREGF is smaller.

In step S408, it is determined whether the required drive output power PREQ is higher than the permissive upper-limit drive output power PREQLMT. When the result of the determination is "YES", the operation proceeds to step S409, and when it is "NO", the process of the present flowchart is terminated.

In step S409, the required drive output power PREQ is set to the permissive upper-limit drive output power PREQLMT. The process of the present flowchart is then terminated.

In step S404, it is determined whether the present inter-vehicle distance D is smaller than a value obtained by adding the permissive delta inter-vehicle distance DDTGL (for determining whether the control for maintaining a constant inter-vehicle distance should be continued) to the target inter-vehicle distance DTG. When the result of the determination is "YES", the operation proceeds to step S405, and when it is "NO", the process of the present flowchart is terminated.

The value of the permissive delta inter-vehicle distance DDTGL varies depending on each running operation, or each driver; thus, the above value obtained by adding DDTGL to DTG is compared with the present inter-vehicle distance D, and the BATT EV mode is continued when the present inter-vehicle distance D is smaller.

In step S405, it is determined whether the required drive output power PREQ is higher than the permissive upper-limit drive output power PREQLMT. When the result of the determination is "YES", the operation proceeds to step S406, and when it is "NO", the process of the present flowchart is terminated.

In step S406, the required drive output power PREQ is set to the permissive upper-limit drive output power PREQLMT. The process of the present flowchart is then terminated.

In step S410, it is determined whether the present vehicle speed VP is higher than a value obtained by subtracting the permissive delta vehicle speed DVPTGL (for determining whether the control for maintaining a constant vehicle speed should be continued) from the target vehicle speed VPTG. When the result of the determination is "YES", the operation proceeds to step S411, and when it is "NO", the process of the present flowchart is terminated.

The value of the permissive delta vehicle speed DVPTGL varies depending on each running operation, or each driver; thus, the above value obtained by subtracting DVPTGL to VPTG is compared with the present vehicle speed VP, and the BATT EV mode is continued when the present vehicle speed VP is higher.

In step S411, it is determined whether the required drive output power PREQ is higher than the permissive upper-limit drive output power PREQLMT. When the result of the determination is "YES", the operation proceeds to step S412, and when it is "NO", the process of the present flowchart is terminated.

In step S412, the required drive output power PREQ is set to the permissive upper-limit drive output power PREQLMT. The process of the present flowchart is then terminated.

Figure 31:
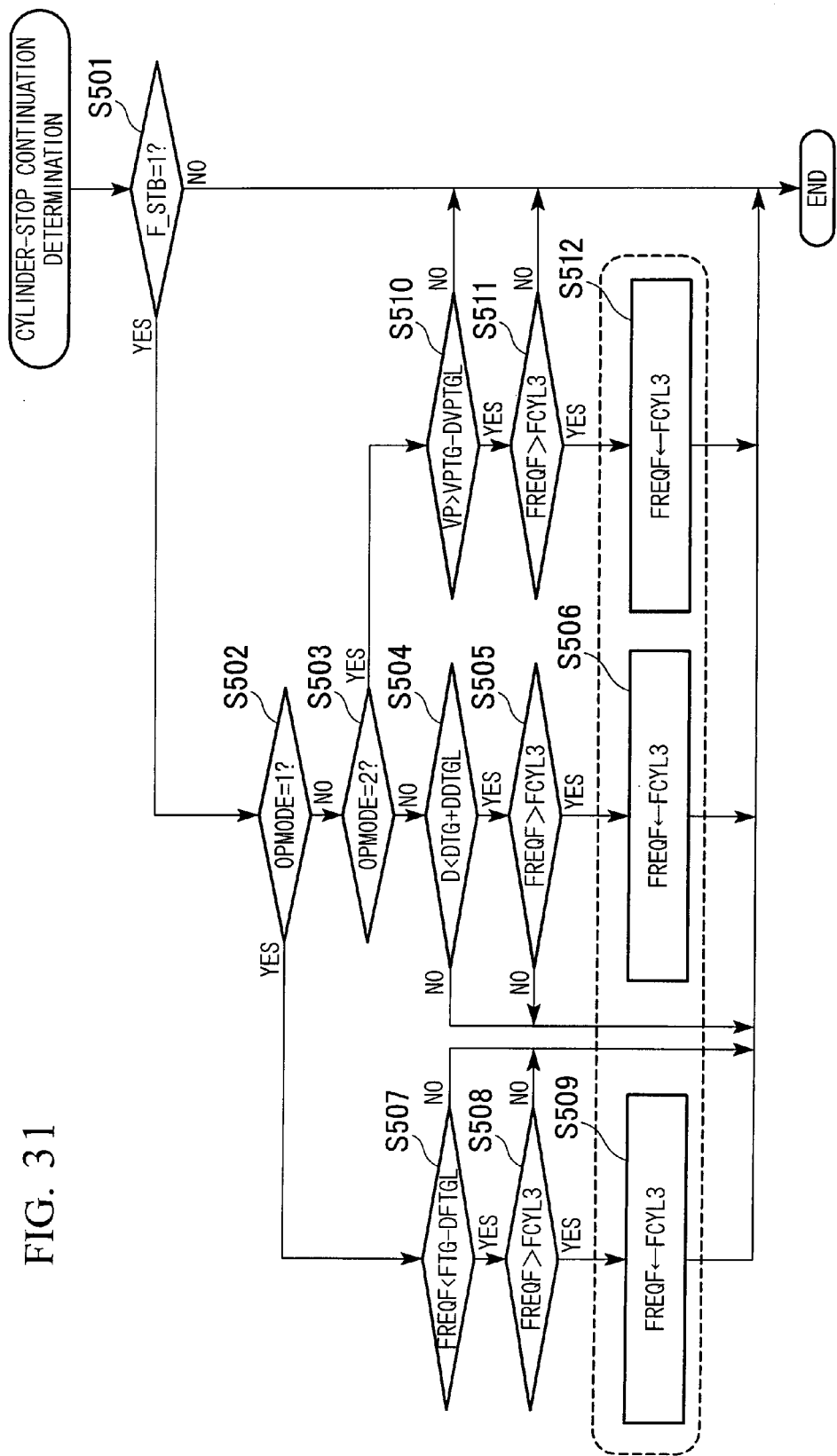
FIG. 31 is a flowchart showing a process of the cylinder-stop continuation determination.

Below, the cylinder-stop continuation determination, performed in step S053A in FIG. 22, will be explained with reference to a flowchart shown in FIG. 31.

Originally, when the required drive output power is large, the vehicle may not run in the cylinder-stop operation mode. However, even in such a case, if some conditions are satisfied (see steps S507, S508, S504, S505, S510, and S511), a required drive output power for running in the cylinder-stop operation mode (i.e., the upper-limit driving force FCYL3 for implementing the cylinder-stop operation mode) can be set so as to enlarge the area of the cylinder-stop operation mode, and to improve the fuel consumption. More specifically, the cylinder-stop continuation determination includes (i) judgment with respect to the above conditions, and (ii) setting the required drive output to FCYL3 after the conditions are satisfied, so as to continue the cylinder-stop operation mode (refer to a part surrounded by a dashed line in FIG. 31).

In step S501, it is determined whether the stability determination flag F_STB has a value of 1. When the result of the determination is "YES", the operation proceeds to step S502, and when it is "NO", the process of the present flowchart is terminated.

In step S502, it is determined whether the maintenance control determination code OPMODE is 1. When the result of the determination is "YES", the operation proceeds to step S507, and when it is "NO", the operation proceeds to step S503.

In step S503, it is determined whether the maintenance control determination code OPMODE is 2. When the result of the determination is "YES", the operation proceeds to step S510, and when it is "NO", the operation proceeds to step S504.

In step S507, it is determined whether the required driving force FREQF (for the forward movement) is smaller than a value obtained by subtracting the permissive delta driving force DFTGL (for determining whether the control for maintaining a constant driving force should be continued) from the target driving force FTG. When the result of the determination is "YES", the operation proceeds to step S508, and when it is "NO", the process of the present flowchart is terminated.

The value of the permissive delta driving force DFTGL varies depending on each running operation, or each driver; thus, the above value obtained by subtracting DFTGL from FTG is compared with the required driving force FREQF (for the forward movement), and the cylinder-stop operation mode is continued when FREGF is smaller.

In step S508, it is determined whether the required driving force FREQF (for the forward movement) is higher than the upper-limit driving force FCYL3 for implementing the cylinder-stop operation mode. When the result of the determination is "YES", the operation proceeds to step S509, and when it is "NO", the process of the present flowchart is terminated.

In step S509, the required driving force FREQF (for the forward movement) is set to the upper-limit driving force FCYL3. The process of the present flowchart is then terminated.

In step S504, it is determined whether the present inter-vehicle distance D is smaller than a value obtained by adding the permissive delta inter-vehicle distance DDTGL (for determining whether the control for maintaining a constant inter-vehicle distance should be continued) to the target inter-vehicle distance DTG. When the result of the determination is "YES", the operation proceeds to step S505, and when it is "NO", the process of the present flowchart is terminated.

The value of the permissive delta inter-vehicle distance DDTGL varies depending on each running operation, or each driver; thus, the above value obtained by adding DDTGL to DTG is compared with the present inter-vehicle distance D, and the cylinder-stop operation mode is continued when the present inter-vehicle distance D is smaller.

In step S505, it is determined whether the required driving force FREQF (for the forward movement) is higher than the upper-limit driving force FCYL3 for implementing the cylinder-stop operation mode. When the result of the determination is "YES", the operation proceeds to step S506, and when it is "NO", the process of the present flowchart is terminated.

In step S506, the required driving force FREQF (for the forward movement) is set to the upper-limit driving force FCYL3. The process of the present flowchart is then terminated.

In step S510, it is determined whether the present vehicle speed VP is higher than a value obtained by subtracting the permissive delta vehicle speed DVPTGL (for determining whether the control for maintaining a constant vehicle speed should be continued) from the target vehicle speed VPTG. When the result of the determination is "YES", the operation proceeds to step S511, and when it is "NO", the process of the present flowchart is terminated.

The value of the permissive delta vehicle speed DVPTGL varies depending on each running operation, or each driver; thus, the above value obtained by subtracting DVPTGL from VPTG is compared with the present vehicle speed VP, and the cylinder-stop operation mode is continued when the present vehicle speed VP is higher.

In step S511, it is determined whether the required driving force FREQF (for the forward movement) is higher than the upper-limit driving force FCYL3 for implementing the cylinder-stop operation mode. When the result of the determination is "YES", the operation proceeds to step S512, and when it is "NO", the process of the present flowchart is terminated.

In step S512, the required driving force FREQF is set to the upper-limit driving force FCYL3. The process of the present flowchart is then terminated.

In accordance with the above embodiment, whether a variation in the degree of depression of the accelerator pedal is caused by a depressing operation for maintaining the driving force is judged by determining whether the degree AP of depression of the accelerator pedal is larger than the lower-limit degree APFL and smaller than the upper-limit degree APFH, both degrees being defined for judgment with respect to maintenance of a constant driving force (see step S109). In addition, when the moving standard deviation VPSD with respect to the vehicle speed is smaller than the vehicle speed judgment value VPSDJUD, whether the driver depresses the accelerator pedal so as to maintain the vehicle speed is judged by determining whether the degree AP of depression of the accelerator pedal is larger than the lower-limit degree APVL and smaller than the upper-limit degree APVH, both degrees being defined for judgment with respect to maintenance of a constant vehicle speed. Therefore, it is possible to clearly grasp the driver's intention of maintaining a constant driving force or vehicle speed, so that the vehicle can run in a mode for maintaining the driving force or the vehicle speed without an influence of the driver's depression of the accelerator pedal. Accordingly, it is possible to prevent the fuel consumption from increasing due to a variation in the depression of the accelerator pedal, which is involuntarily performed by the driver, and thus the fuel consumption can be improved.

In addition, when the moving standard deviation DSD with respect to the inter-vehicle distance is smaller than the inter-vehicle distance judgment value DSDJUD, whether the driver depresses the accelerator pedal so as to maintain the inter-vehicle distance is judged by determining whether the degree AP of depression of the accelerator pedal is larger than the lower-limit degree APDL and smaller than the upper-limit degree APDH, both degrees being defined for judgment with respect to maintenance of a constant inter-vehicle distance. Therefore, it is possible to clearly grasp the driver's intention of maintaining a constant inter-vehicle distance, so that the vehicle can run in a mode for maintaining the inter-vehicle distance without an influence of the driver's depression of the accelerator pedal. Accordingly, also in this case, it is possible to prevent the fuel consumption from increasing due to a variation in the depression of the accelerator pedal, which is involuntarily performed by the driver, and thus the fuel consumption can be improved.

The range of the degree of depression of the accelerator pedal (i.e., $APVL<AP<APVH$) by which the mode for maintaining the vehicle speed is determined (i) covers the range of the degree of depression of the accelerator pedal (i.e., $APFL<AP<APFH$) by which the mode for maintaining the driving force is determined, and (ii) is defined within the range of the degree of depression of the accelerator pedal (i.e., $APDL<AP<APDH$) by which the mode for maintaining the inter-vehicle distance is determined. Therefore, the frequency of selecting the control target (here, maintenance of driving force) corresponding to a smaller variation in the degree of depression of the accelerator pedal is increased.

In addition, with respect to each mode for maintaining the driving force, the vehicle speed, or the inter-vehicle distance, even when the above-described specific conditions are satisfied, the mode is executed only when a predetermined time period (i.e., the timer value TSTB1) has been counted (i.e., in the case of "YES" in each of steps S110, S120, and S130). That is, when each condition is not satisfied during the predetermined time period, the relevant mode is not executed. Furthermore, each mode for maintaining the driving force, the vehicle speed, or the inter-vehicle distance is released only when the specific conditions have not been satisfied for a specific time period (i.e., the timer value TSTB2, and in the case of "YES" in each of steps S115, S125, and S135). That is, each mode is not released until a state in which the specific conditions are not satisfied has continued for the specific time period, thereby preventing a hunting phenomenon with respect to the relevant control.

On the other hand, originally, when the required drive output power is large, the vehicle may not run in the BATT EV mode. However, even in such a case, if some conditions are satisfied (see steps S407, S408, S404, S405, S410, and S411), the required drive output power for running in the BATT EV mode (i.e., the permissive upper-limit drive output power PREQLMT for the driving operation in the BATT EV mode) can be set so as to enlarge the EV mode area, so that the vehicle can run using a motor. Therefore, the fuel consumption can be improved.

Also originally, when the required drive output power is large, the vehicle may not run in the cylinder-stop operation mode. However, even in such a case, if some conditions are satisfied (see steps S507, S508, S504, S505, S510, and S511), the required drive output power for running in the cylinder-stop operation mode (i.e., the upper-limit driving force FCYL3 for implementing the cylinder-stop operation mode) can be set so as to enlarge the area of the cylinder-stop operation mode, thereby performing the cylinder stop operation and improving the fuel consumption.

When the vehicle runs within such an enlarged area with respect to the BATT EV mode or the cylinder-stop operation mode, if the driver feels unsatisfactory and depresses the accelerator pedal, the degree of this depression of the accelerator pedal is used as the next maintenance-control limit data value (i.e., DFTGL, DVPTGL, or DDTGL), and thus influences the next control. Therefore, it is possible to perform a control by which the driver does not feel unsatisfactory, and which does not hinder the preference of the driver.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, instead of an engine which can be switched between the full-cylinder operation and the partial cylinder-stop operation as a lower fuel consumption mode, the present invention can also be applied to a vehicle having an engine which can perform a lean-burn operation or an HCCI operation (in which a gasoline engine performs self ignition by direct jetting).

Also in the above embodiment, the speed change box is a 5-speed gear box; however, it may also be a 6-speed gear box.

Also in the above embodiment, the engine has six cylinders and three of them can be stopped in the cylinder stop operation. However, the present invention can also be applied to a vehicle having any engine which can perform a (partial) cylinder stop operation, for example, an engine having four cylinders in which one or two cylinders are stopped in the cylinder stop operation.

In a variation of the above embodiment, front wheels are driven using the engine E and the second motor M2 while rear wheels are driven using the first motor M1. In addition to this structure, another motor for independently driving the front wheels may further be provided.

In addition, the first motor M1 and the second motor M2 are used in the above-described embodiment; however, the present invention can also be applied to a hybrid vehicle which has any one of these motors.

The present invention can also be applied to a vehicle which has only the driving-force maintenance mode and the vehicle-speed maintenance mode.

The present invention can also be applied to an ordinary gasoline-driven vehicle having no motor, in which a dead zone is provided for the degree of depression of the accelerator pedal (i.e., the driver's depression of the accelerator pedal is invalid in the dead zone), and running is performed by setting a control target in accordance with the depression of the accelerator pedal when the degree is out of the dead zone.

What is claimed is:

1. A running control apparatus for a vehicle, wherein the control apparatus controls a state of running using a driving source for generating a driving force of the vehicle, and comprises:
    an accelerator pedal measuring device for measuring a degree of depression of an accelerator pedal of the vehicle; and
    a vehicle speed measuring device for measuring a vehicle speed of the vehicle,
    wherein a driving-force maintenance mode for maintaining the driving force or a vehicle-speed maintenance mode for maintaining the vehicle speed is executed based on the measured degree of depression of the accelerator pedal and the measured vehicle speed, and
    wherein when an amount of variation in the degree of depression of the accelerator pedal is within a predetermined first range, the driving-force maintenance mode is executed; and when the amount of variation in the degree of depression of the accelerator pedal is within a predetermined second range, and an amount of variation in the vehicle speed is within a predetermined range, the vehicle-speed maintenance mode is executed.

2. The running control apparatus in accordance with claim 1, further comprising:
    an inter-vehicle distance measuring device for measuring an inter-vehicle distance between the present vehicle and a vehicle ahead thereof,
    wherein an inter-vehicle-distance maintenance mode is also provided so as to maintain the inter-vehicle distance based on the measured degree of depression of the accelerator pedal and the measured inter-vehicle distance; and
    wherein when an amount of variation in the degree of depression of the accelerator pedal is within a predetermined third range, and an amount of variation in the inter-vehicle distance is within a predetermined range, the inter-vehicle-distance maintenance mode is executed.

3. The running control apparatus in accordance with claim 2, wherein:
    the predetermined first range is set within the predetermined second range; and the predetermined second range is set within the predetermined third range.

4. The running control apparatus in accordance with claim 2, wherein:
    the predetermined first range, the predetermined second range, and the predetermined third range are each set based on a moving average with respect to the degree of depression of the accelerator pedal.

5. The running control apparatus in accordance with claim 2, wherein:
    each of the driving-force maintenance, vehicle-speed maintenance, and inter-vehicle-distance maintenance modes is executed when the condition for executing the mode has been satisfied for a predetermined time period.

6. The running control apparatus in accordance with claim 2, wherein:
    each of the driving-force maintenance, vehicle-speed maintenance, and inter-vehicle-distance maintenance modes is released when the condition for executing the mode has not been satisfied for a predetermined time period.

7. The running control apparatus in accordance with claim 2, wherein:
    the vehicle is a hybrid vehicle which can run by only using a motor;
    an upper limit of a required drive output power is set so as to determine whether running of the vehicle by only using the motor can be continued;
    while the inter-vehicle-distance maintenance mode is executed, a difference between the inter-vehicle distance, which is measured when the amount of variation in the degree of depression of the accelerator pedal exceeds the predetermined third range in the previous execution of the inter-vehicle-distance maintenance mode, and a target value of the inter-vehicle distance set in the previous execution of the inter-vehicle-distance maintenance mode is determined as a control maintenance permissive value; and when the sum of a target value of the inter-vehicle distance set in the present execution of the inter-vehicle-distance maintenance mode and the control maintenance permissive value is larger than a present value of the inter-vehicle distance, and the required drive output power with respect to the motor is larger than the upper limit, the required drive output power is set to the upper limit.

8. The running control apparatus in accordance with claim 2, wherein:

the vehicle can execute a cylinder stop operation in which cylinders of an engine are partially stopped;

an upper limit of a required value of the driving force is set so as to determine whether the cylinder stop operation can be continued;

while the inter-vehicle-distance maintenance mode is executed, a difference between the inter-vehicle distance, which is measured when the amount of variation in the degree of depression of the accelerator pedal exceeds the predetermined third range in the previous execution of the inter-vehicle-distance maintenance mode, and a target value of the inter-vehicle distance set in the previous execution of the inter- vehicle-distance maintenance mode is determined as a control maintenance permissive value; and when the sum of a target value of the inter-vehicle distance set in the present execution of the inter-vehicle-distance maintenance mode and the control maintenance permissive value is larger than a present value of the inter-vehicle distance, and the required value of the driving force is larger than the upper limit, the required value is set to the upper limit.

9. The running control apparatus in accordance with claim 1, wherein:

the vehicle is a hybrid vehicle which can run by only using a motor;

an upper limit of a required drive output power is set so as to determine whether running of the vehicle by only using the motor can be continued;

while the driving-force maintenance mode is executed, a difference between the driving force, which is measured when the amount of variation in the degree of depression of the accelerator pedal exceeds the predetermined first range in the previous execution of the driving-force maintenance mode, and a target value of the driving force set in the previous execution of the driving-force maintenance mode is determined as a control maintenance permissive value; and when a difference between a target value of the driving force set in the present execution of the driving-force maintenance mode and the control maintenance permissive value is larger than a present required value of the driving force, and the required drive output power with respect to the motor is larger than the upper limit, the required drive output power is set to the upper limit.

10. The running control apparatus in accordance with claim 1, wherein:

the vehicle is a hybrid vehicle which can run by only using a motor;

an upper limit of a required drive output power is set so as to determine whether running of the vehicle by only using the motor can be continued;

while the vehicle-speed maintenance mode is executed, a difference between the vehicle speed, which is measured when the amount of variation in the degree of depression of the accelerator pedal exceeds the predetermined second range in the previous execution of the vehicle-speed maintenance mode, and a target value of the vehicle speed set in the previous execution of the vehicle-speed maintenance mode is determined as a control maintenance permissive value; and when a difference between a target value of the vehicle speed set in the present execution of the vehicle-speed maintenance mode and the control maintenance permissive value is smaller than a present value of the vehicle speed, and the required drive output power with respect to the motor is larger than the upper limit, the required drive output power is set to the upper limit.

11. The running control apparatus in accordance with claim 1, wherein:

the vehicle can execute a cylinder stop operation in which cylinders of an engine are partially stopped;

an upper limit of a required value of the driving force is set so as to determine whether the cylinder stop operation can be continued;

while the driving-force maintenance mode is executed, a difference between the driving force, which is measured when the amount of variation in the degree of depression of the accelerator pedal exceeds the predetermined first range in the previous execution of the driving-force maintenance mode, and a target value of the driving force set in the previous execution of the driving-force maintenance mode is determined as a control maintenance permissive value; and when a difference between a target value of the driving force set in the present execution of the driving-force maintenance mode and the control maintenance permissive value is larger than a present value of the required value of the driving force, and the required value of the driving force is larger than the upper limit, the required value is set to the upper limit.

12. The running control apparatus in accordance with claim 1, wherein:

the vehicle can execute a cylinder stop operation in which cylinders of an engine are partially stopped;

an upper limit of a required value of the driving force is set so as to determine whether the cylinder stop operation can be continued;

while the vehicle-speed maintenance mode is executed, a difference between the vehicle speed, which is measured when the amount of variation in the degree of depression of the accelerator pedal exceeds the predetermined second range in the previous execution of the vehicle-speed maintenance mode, and a target value of the vehicle speed set in the previous execution of the vehicle-speed maintenance mode is determined as a control maintenance permissive value; and when a difference between a target value of the vehicle speed set in the present execution of the vehicle-speed maintenance mode and the control maintenance permissive value is smaller than a present value of the vehicle speed, and the required value of the driving force is larger than the upper limit, the required value is set to the upper limit.

13. A running control apparatus for a vehicle, wherein the control apparatus controls a state of running using a driving source for generating a driving force of the vehicle, and comprises:

an operation target determination device for determining whether a depressing operation of an accelerator pedal of the vehicle is performed for an operation target which is one of maintenance of the driving force, maintenance of a vehicle speed of the vehicle, and maintenance of an inter-vehicle distance between the present vehicle and a vehicle ahead thereof, and a maintenance device for performing the operation target, which is determined by the operation target determination device, when it is determined that one of the maintenance of the driving force, the maintenance of the vehicle speed, and the maintenance of the inter-vehicle distance is targeted, wherein the maintenance device performs the operation target regardless of a variation in a degree of depression of the accelerator pedal for a predetermined range of the degree of depression of the accelerator pedal.

14. The running control apparatus in accordance with claim 13, wherein:

the vehicle is a hybrid vehicle which can run by only using a motor;

an upper limit of a required drive output power is set so as to determine whether running of the vehicle by only using the motor can be continued;

when it is determined by the operation target determination device that none of the maintenance of the driving force, the maintenance of the vehicle speed, and the maintenance of the inter-vehicle distance is targeted, a first difference between a target value of the driving force and a driving force corresponding to a present degree of depression of the accelerator pedal, a second difference between a target value and a present value of the vehicle speed, and a third difference between a target value and a present value of the inter-vehicle distance are respectively set as a first control-maintenance permissive value, a second control-maintenance permissive value, and a third control-maintenance permissive value;

when it is determined by the operation target determination device that the maintenance of the driving force is targeted, and a difference between the target value of the driving force and the first control-maintenance permissive value is larger than a present required value of the driving force, if the required drive output power with respect to the motor is larger than the upper limit, the required drive output power is set to the upper limit;

when it is determined by the operation target determination device that the maintenance of the vehicle speed is targeted, and a difference between the target value of the vehicle speed and the second control-maintenance permissive value is smaller than the present value of the vehicle speed, if the required drive output power with respect to the motor is larger than the upper limit, the required drive output power is set to the upper limit; and when it is determined by the operation target determination device that the maintenance of the inter-vehicle distance is targeted, and the sum of the target value of the inter-vehicle distance and the third control-maintenance permissive value is larger than the present value of the inter-vehicle distance, if the required drive output power with respect to the motor is larger than the upper limit, the required drive output power is set to the upper limit.

15. The running control apparatus in accordance with claim 13, wherein:

the vehicle can execute a cylinder stop operation in which cylinders of an engine are partially stopped;

an upper limit of a required value of the driving force is set so as to determine whether the cylinder stop operation can be continued;

when it is determined by the operation target determination device that none of the maintenance of the driving force, the maintenance of the vehicle speed, and the maintenance of the inter-vehicle distance is targeted, a first difference between a target value of the driving force and a driving force corresponding to a present degree of depression of the accelerator pedal, a second difference between a target value and a present value of the vehicle speed, and a third difference between a target value and a present value of the inter-vehicle distance are respectively set as a first control-maintenance permissive value, a second control-maintenance permissive value, and a third control-maintenance permissive value;

when it is determined by the operation target determination device that the maintenance of the driving force is targeted, and a difference between the target value of the driving force and the first control-maintenance permissive value is larger than the required value of the driving force, if the required value of the driving force is larger than the upper limit, the required value is set to the upper limit;

when it is determined by the operation target determination device that the maintenance of the vehicle speed is targeted, and a difference between the target value of the vehicle speed and the second control-maintenance permissive value is smaller than the present value of the vehicle speed, if the required value of the driving force is larger than the upper limit, the required value is set to the upper limit; and when it is determined by the operation target determination device that the maintenance of the inter-vehicle distance is targeted, and the sum of the target value of the inter-vehicle distance and the third control-maintenance permissive value is larger than the present value of the inter-vehicle distance, if the required value of the driving force is larger than the upper limit, the required value is set to the upper limit.

* * * * *